(12) United States Patent
Shin et al.

(10) Patent No.: US 12,356,435 B2
(45) Date of Patent: Jul. 8, 2025

(54) METHOD AND APPARATUS FOR RESOURCE ALLOCATION BY SIDELINK INTER-UE COORDINATION IN COMMUNICATION SYSTEM

(71) Applicant: Samsung Electronics Co., Ltd., Suwon-si (KR)

(72) Inventors: Cheolkyu Shin, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 17/840,095

(22) Filed: Jun. 14, 2022

(65) Prior Publication Data

US 2022/0417919 A1    Dec. 29, 2022

(30) Foreign Application Priority Data

Jun. 15, 2021    (KR) .......................... 10-2021-0077651

(51) Int. Cl.
*H04W 72/40*    (2023.01)
*H04W 4/40*    (2018.01)
(Continued)

(52) U.S. Cl.
CPC ............ *H04W 72/40* (2023.01); *H04W 4/40* (2018.02); *H04W 72/02* (2013.01); *H04W 72/25* (2023.01); *H04W 92/18* (2013.01)

(58) Field of Classification Search
CPC ....... H04W 72/40; H04W 4/40; H04W 72/25; H04W 72/02; H04W 92/18
See application file for complete search history.

(56) References Cited

U.S. PATENT DOCUMENTS

| | | | |
|---|---|---|---|
| 2023/0371090 A1* | 11/2023 | Miao | H04W 76/14 |
| 2023/0403730 A1* | 12/2023 | Shen | H04W 72/02 |
| 2023/0422216 A1* | 12/2023 | Hong | H04W 72/25 |

FOREIGN PATENT DOCUMENTS

| | | |
|---|---|---|
| WO | 2020/028662 A1 | 2/2020 |
| WO | 2020/033628 A1 | 2/2020 |
| WO | 2021/241958 A1 | 12/2021 |

OTHER PUBLICATIONS

Zte et al., Discussion on the inter-UE coordination, R1-2105200, 3GPP TSG RAN WG1 Meeting #105-e, May 12, 2021, e-Meeting.

(Continued)

*Primary Examiner* — Chandrahas B Patel
(74) *Attorney, Agent, or Firm* — Jefferson IP Law, LLP

(57) ABSTRACT

The disclosure relates to technologies for sensor networks, machine to machine (M2M), machine type communication (MTC), and Internet of things (IoT). The disclosure may be used for intelligent services (smart homes, smart buildings, smart cities, smart cars or connected cars, healthcare, digital education, retail, security and safety-related services, or the like) based on the above technology. A method of inter-user equipment (UE) coordination in sidelink communication and a procedure through which the UE performs resource selection are provided. The method includes receiving a request message requesting transmission of inter-UE coordination information from a second UE, determining inter-UE coordination information based on the request message, and transmitting the determined inter-UE coordination information to the second UE.

16 Claims, 14 Drawing Sheets

(51) Int. Cl.
H04W 72/02 (2009.01)
H04W 72/25 (2023.01)
H04W 92/18 (2009.01)

(56) References Cited

OTHER PUBLICATIONS

Moderator (LG Electronics), Feature lead summary for AI 8.11.1.2 Inter-UE coordination for Mode 2 enhancements, R1-2106338, 3GPP TSG RAN WG1 Meeting #105-e, May 28, 2021, e-Meeting.
Nokia et al., Inter-UE coordination in mode 2 sidelink resource allocation, R1-2104177, 3GPP TSG RAN WG1 Meeting #105-e, May 12, 2021, e-Meeting.
International Search Report dated Sep. 23, 2022, issued in International Application No. PCT/KR2022/008455.
Extended European Search Report dated May 15, 2024, issued in European Patent Application No. 22825308.4.
VIVO: Discussion on mode 2 enhancements, 3GPP Draft; R1-2106200, 3rd Generation Partnership Project (3GPP), Mobile Competence Centre ; 650, Route Des Lucioles ; F-06921 Sophia-Antipolis Cedex ; France, vol. RAN WG1, No. e-Meeting; XP052015751, May 27, 2021.
Fraunhofer HHI et al: Resource Allocation Enhancements for Mode 2, 3GPP Draft; R1-2100702, 3rd Generation Partnership Project (3GPP), Mobile Competence Centre ; 650, Route Des Lucioles ; F-06921 Sophia-Antipolis Cedex ; France vol. RAN WG1, No. e-Meeting; XP051970475, Jan. 18, 2021.

\* cited by examiner

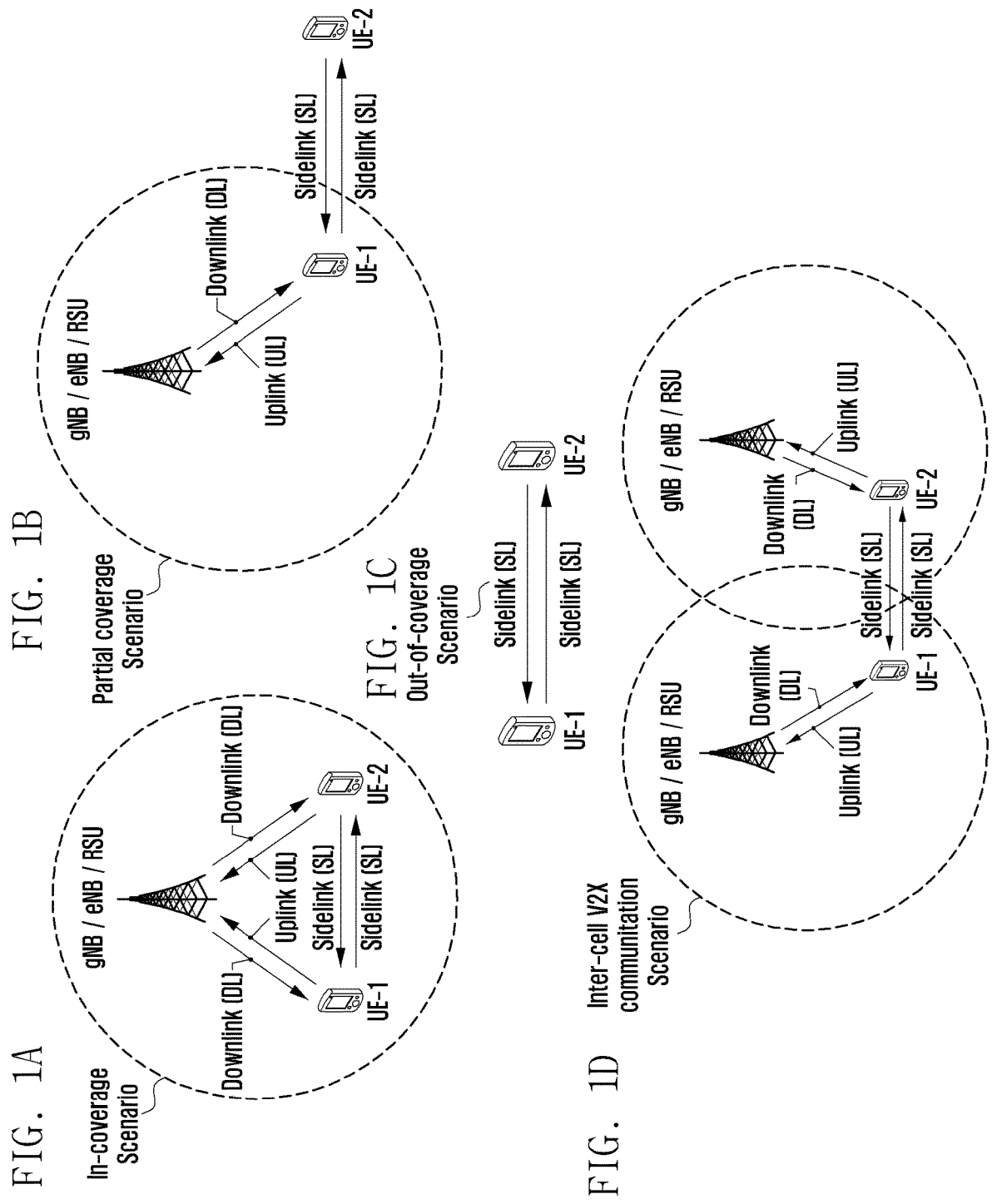

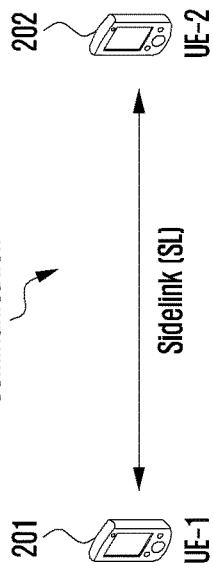
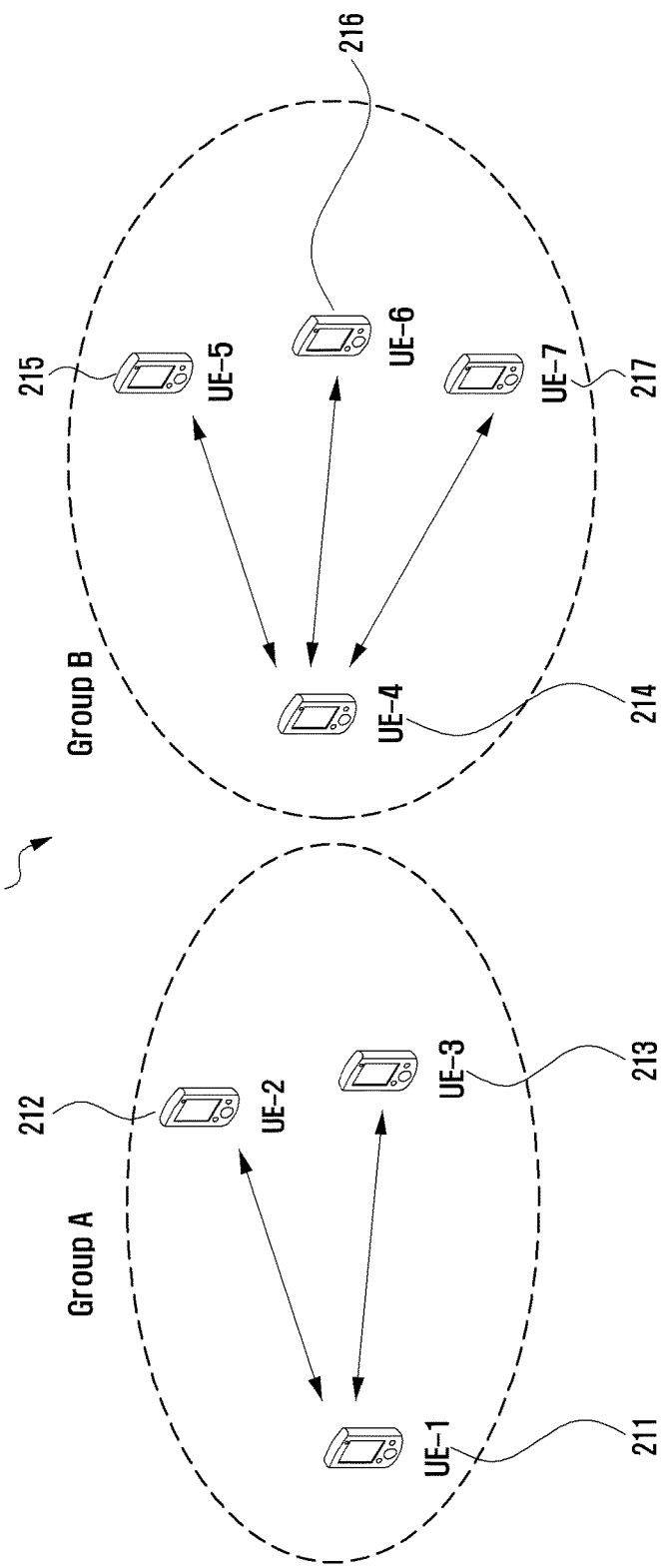

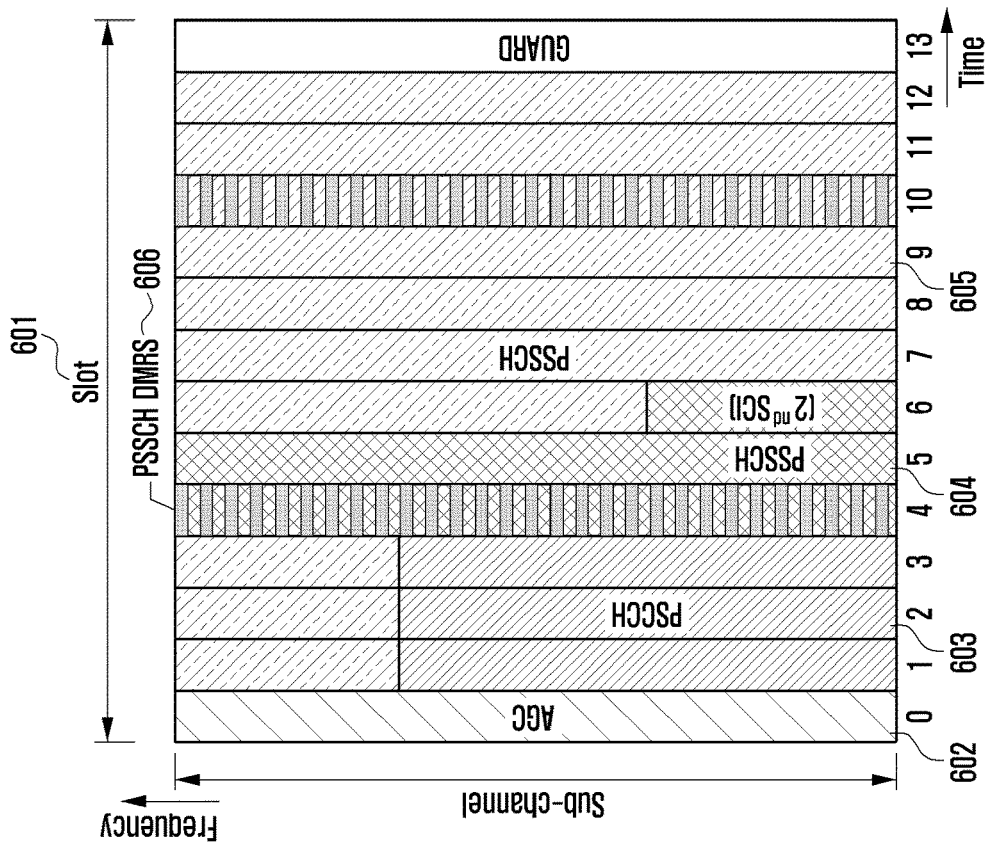
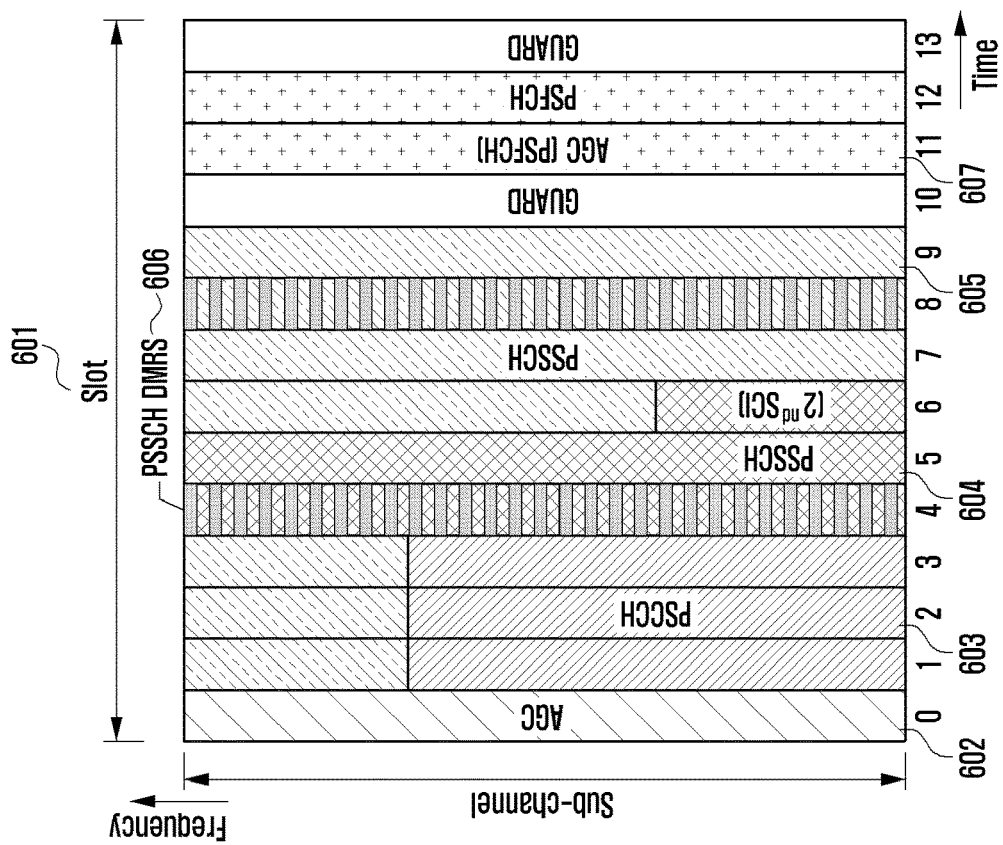
FIG. 6A
FIG. 6B

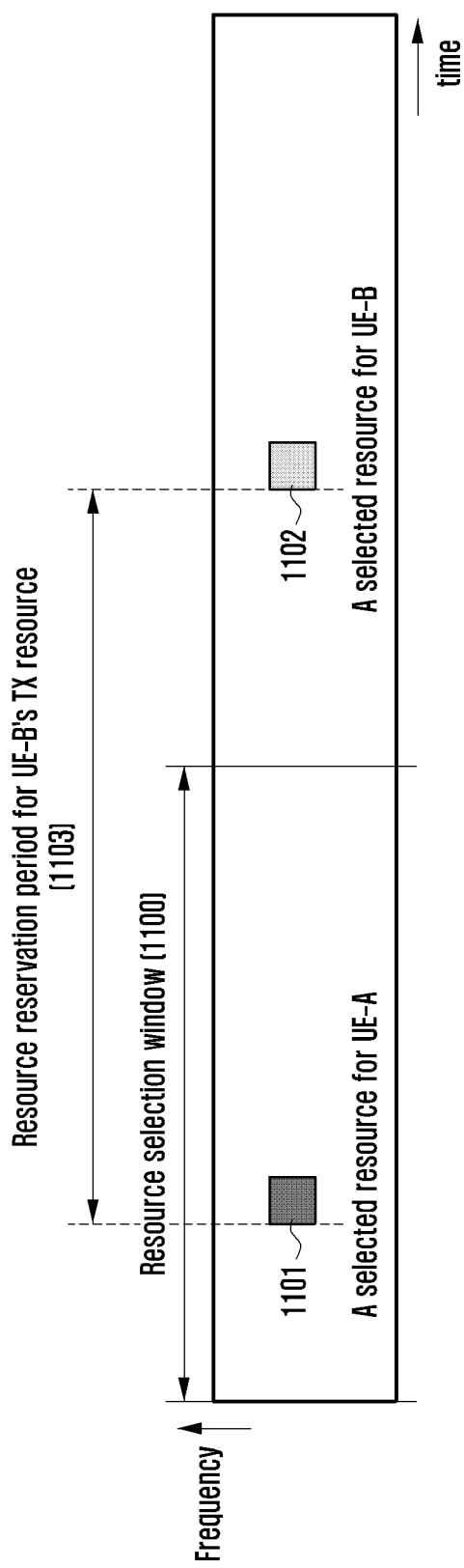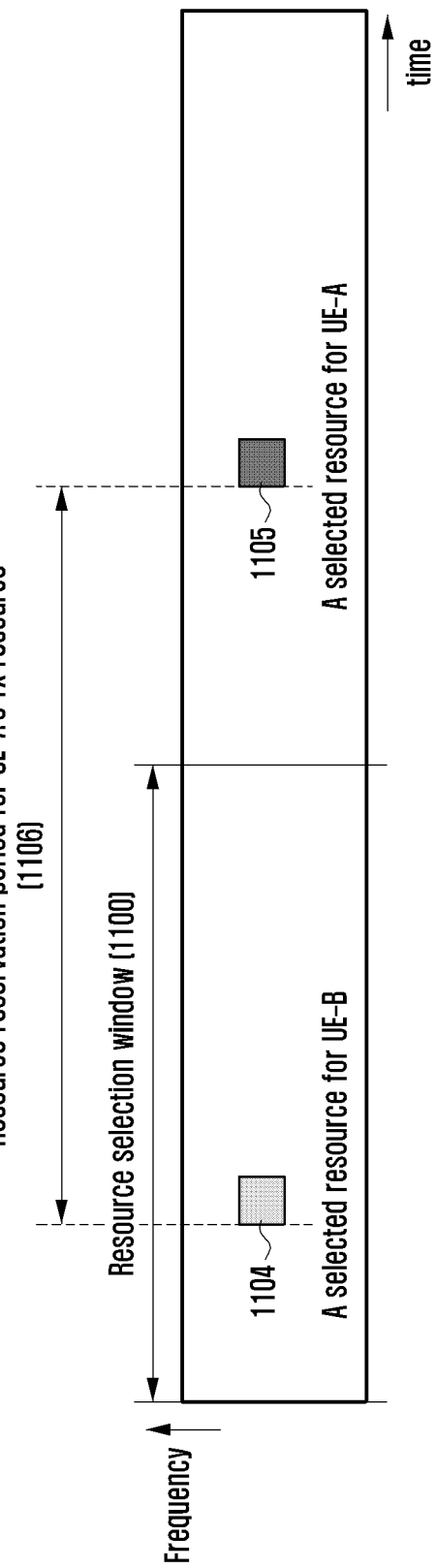

METHOD AND APPARATUS FOR RESOURCE ALLOCATION BY SIDELINK INTER-UE COORDINATION IN COMMUNICATION SYSTEM

CROSS-REFERENCE TO RELATED APPLICATION(S)

This application is based on and claims priority under 35 U.S.C. § 119(a) of a Korean patent application number 10-2021-0077651, filed on Jun. 15, 2021, in the Korean Intellectual Property Office, the disclosure of which is incorporated by reference herein in its entirety.

BACKGROUND

1. Field

The disclosure relates to a communication system. More particularly, the disclosure relates to a method and an apparatus for performing resource allocation through inter-user equipment (UE) coordination in a process in which a vehicle UE configured to support vehicle-to-everything (V2X) communication transmits/receives information with another vehicle UE and a pedestrian-carried UE by using a sidelink.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "beyond 4G network" communication system or a "post long term evolution (LTE)" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (cloud RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication system, more particularly, to provide a method and an apparatus for performing resource allocation through inter-UE coordination in a process in which a vehicle user equipment (UE) configured to support vehicle-to-everything (V2X) communication transmits/receives information with another vehicle UE and a pedestrian-carried UE by using a sidelink.

Another aspect of the disclosure is to provide a method for exchanging information for inter-UE coordination, a method for allocating a sidelink transmission resource by using the same, and operations of a base station and a UE regarding the same.

Additional aspects will be set forth in part in the description which follows and, in part, will be apparent from the description, or may be learned by practice of the presented embodiments.

In accordance with an aspect of the disclosure, a method performed by a first UE in a wireless communication system is provided. The method performed by a first UE includes receiving a request message requesting transmission of inter-UE coordination information from a second UE, wherein the request message includes first resource set information and resource set type information which indicates whether the first resource set information is preferred or not preferred by the second UE, determining inter-UE coordination information based on the request message, and transmitting the determined inter-UE coordination information to the second UE, wherein the first UE is configured to transmit inter-UE coordination information for sidelink communication, and wherein the inter-UE coordination information includes second resource set information determined based on the first resource set information and the resource set type information.

In accordance with another aspect of the disclosure, a method performed by a second UE in a wireless communication system is provided. The method performed by a second UE includes transmitting a request message requesting transmission of inter-UE coordination information to a first UE, wherein the request message includes first resource set information and resource set type information which indicates whether the first resource set information is preferred or not preferred by the second UE, and receiving inter-UE coordination information determined based on the request message from the first UE, wherein the second UE is configured to receive inter-UE coordination information for sidelink communication of the second UE from another UE, and wherein the inter-UE coordination information includes second resource set information determined based on the first resource set information and the resource set type information.

In accordance with another aspect of the disclosure, a first UE in a wireless communication system is provided. The first UE includes a transceiver, and at least one processor configured to receive a request message requesting transmission of inter-UE coordination information from a second UE, wherein the request message includes first resource set information and resource set type information which indicates whether the first resource set information is preferred or not preferred by the second UE, determine inter-UE coordination information based on the request message, and transmit the determined inter-UE coordination information to the second UE, wherein the first UE is configured to transmit inter-UE coordination information for sidelink communication, and wherein the inter-UE coordination information includes second resource set information determined based on the first resource set information and the resource set type information.

In accordance with another aspect of the disclosure a second UE in a wireless communication system is provided. The second UE includes a transceiver, and at least one processor configured to transmit a request message requesting transmission of inter-UE coordination information to a first UE, wherein the request message includes first resource set information and resource set type information which indicates whether the first resource set information is preferred or not preferred by the second UE, and receive inter-UE coordination information determined based on the request message from the first UE, wherein the second UE is configured to receive inter-UE coordination information for sidelink communication of the second UE from another UE, and wherein the inter-UE coordination information includes second resource set information determined based on the first resource set information and the resource set type information.

Another aspect of the disclosure is to provide a method for inter-UE coordination during sidelink communication, and a procedure in which a UE performs resource allocation by using the same. Accordingly, the performance of resource allocation may be improved during sidelink communication. There is also an advantageous effect in that power consumed by the UE can be minimized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 1A, 1B, 1C, and 1D are diagrams illustrating a communication system to which disclosure may be applied according to an embodiment of the disclosure;

FIGS. 2A and 2B are diagrams illustrating a vehicle-to-everything (V2X) communication method performed through a sidelink according to an embodiment of the disclosure;

FIGS. 6A and 6B are diagrams illustrating a mapping structure of physical channels mapped to one slot in a sidelink according to an embodiment of the disclosure;

FIGS. 11A and 11B are diagrams illustrating resource allocation when the inter-UE coordination method 1 is used according to an embodiment of the disclosure;

Throughout the drawings, it should be noted that like reference numbers are used to depict the same or similar elements, features, and structures.

DETAILED DESCRIPTION

Figure 3:
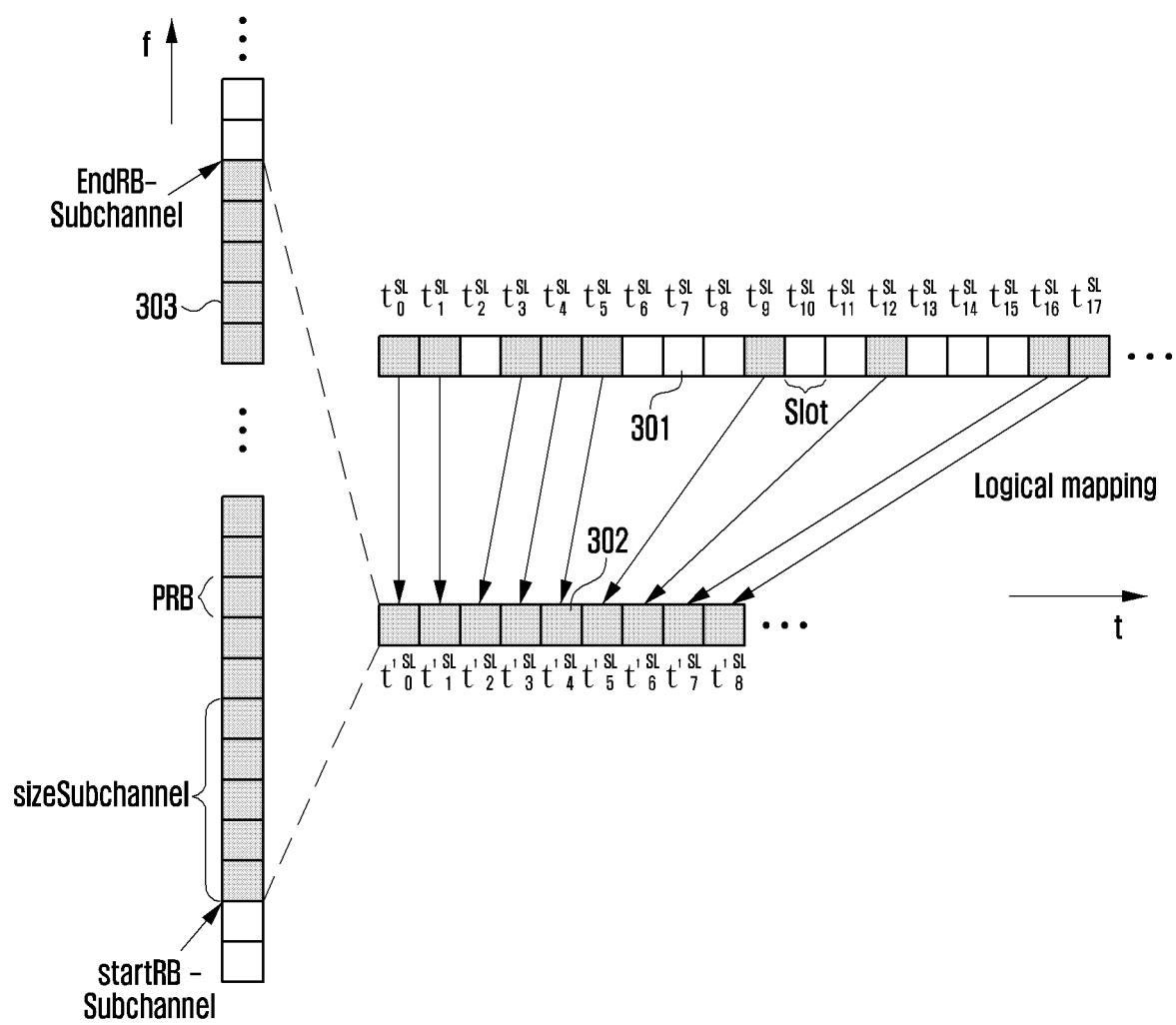
FIG. 3 is a diagram illustrating a resource pool defined as a set of resources on time and frequency used for transmission and reception of a sidelink according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

The following detailed description of embodiments of the disclosure is mainly directed to new RAN (NR) as a radio access network and packet core (5G system, 5G core network, or new generation core (NG Core)) as a core network, which are specified in the 5G mobile communication standards defined by the 3rd generation partnership project long term evolution (3GPP LTE) that is a mobile communication standardization group, but based on determinations by those skilled in the art, the main idea of the disclosure may be applied to other communication systems having similar backgrounds or channel types through some modifications without significantly departing from the scope of the disclosure.

In the 5G system, in order to support network automation, a network data collection and analysis function (NWDAF), which is a network function that provides a function to analyze and provide data collected from a 5G network, may be defined. The NWDAF may collect/store/analyze information from 5G networks and provide the results to unspecified network functions (NFs), and the analysis results may be used independently in each NF.

In the following description, some of terms and names defined in the 3GPP standards (standards for 5G, NR, LTE, or other similar systems) may be used for the convenience of description. However, the disclosure is not limited by these terms and names, and may be applied in the same way to systems that conform other standards.

Further, in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

To meet the demand for wireless data traffic having increased since deployment of 4G communication systems, efforts have been made to develop improved 5G communication systems (new radio (NR)). The 5G communication systems have been designed to be supported also in ultrahigh frequency (mmWave) bands (e.g., 28 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are under discussion in the 5G communication systems. Further, unlike in the LTE, in the 5G communication systems, various subcarrier spacings including 15 kHz, such as 30 kHz, 60 kHz, and 120 kHz, are supported, physical control channels use polar coding, and physical data channels use low density parity check (LDPC). In addition, CP-OFDM, as well as DFT-S-OFDM, is also used as a waveform for uplink transmission. While the LTE supports transport block (TB)-based hybrid ARQ (HARQ) retransmission, the 5G can additionally support HARQ retransmission based on a code block group (CBG) which is a bundle of multiple code blocks (CBs).

In addition, in 5G communication systems, development for system network improvement is under way based on advanced small cells, cloud radio access networks (RANs), ultra-dense networks, device-to-device (D2D) communication, wireless backhaul, vehicle-to-everything (V2X) network, cooperative communication, coordinated multi-points (CoMP), reception-end interference cancellation, and the like.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

As described above, a plurality of services may be provided to a user in a communication system, and in order to provide such a plurality of services to a user, a method for providing each service within the same time period according to the characteristics and an apparatus using the same are required. Various services provided in the 5G communication system are being studied, and one of the various services is a service that satisfies the requirements for low latency and high reliability. More particularly, in the case of vehicle communication, the NR V2X system supports UE-to-UE unicast communication, groupcast (or multicast) communication, and broadcast communication. In addition, unlike LTE V2X, which aims to transmit and receive basic safety information necessary for road driving of vehicles, the NR V2X aims to provide more advanced services, such as platooning, advanced driving, extended sensors, and remote driving.

More particularly, inter-UE coordination may be considered in the sidelink. Here, the inter-UE coordination may mean providing a more advanced sidelink service by sharing information that may be helpful to UEs. In the disclosure, information shared for the inter-UE coordination is not limited to specific information. Resource allocation information may be included in such information. In general, an UE performing transmission in the sidelink allocates resources through direct sensing and resource allocation procedure (Mode2), or resources may be allocated from the base station (Mode1) in a case where the UE performing transmission is within the coverage of the base station. However, a method in which the UE receives resource allocation and resource allocation-related information from another UE through inter-UE coordination may be additionally considered. A method of receiving resource allocation and resource allocation-related information from another UE through inter-UE coordination may have, for example, the following advantages. First, there are cases in which it is more advantageous to receive resources allocation from another UE. For example, considering a groupcast scenario, it may be advantageous for groupcast operation for the group leader UE to directly control the resource allocation of other UEs belonging to the group to provide resource allocation and resource allocation-related information to other UEs belonging to the group. In addition, in a case where the UE performing transmission is located outside the coverage of the base station and the UE receiving the same is located within the coverage of the base station, assuming that the base station may receive information related to resource allocation from the UEs to better allocate resources of the sidelink UE, it is possible to consider a method in which the UE within the base station coverage receives resource allocation information from the base station and delivers the same to the UE outside the base station coverage. In addition, rather than a method in which a UE performing sidelink transmission allocates a resource through a direct sensing and resource allocation procedure, a method in which the receiving UE directly performs sensing and resource allocation procedures, and instructs the transmitting UE the resource allocation location desired to be received from the transmitting UE may be considered. Accordingly, it is possible to address the issues of hidden node, exposed node, and half duplex to provide advanced resource allocation performance in sidelink communication. In addition, the second reason why it is more advantageous to receive resource allocation from another UE is that, if the UE performing the transmission is a UE requiring low power consumption, such as a mobile UE, the other UE performs resource allocation instead, thereby minimizing power consumption of the UE performing transmission. In this case, it is noted that a large amount of power may be consumed for the UE to perform sensing to select a sidelink transmission resource. Based on the above-described advantages, in order to share information related to resource allocation through inter-UE coordination, it is necessary to define an operation of a UE and a base station. Accordingly, in performing inter-UE coordination through the disclosure, it is intended to provide methods for indicating how a UE performing a corresponding operation is determined, what information is required, and resource allocation information.

Various embodiments of the disclosure described below are proposed to support the above-described scenario, and more particularly, an aspect of the disclosure is to provide a method for performing inter-UE coordination on a sidelink, and a method and apparatus for providing resource allocation-related information through the method.

FIGS. 1A, 1B, 1C, and 1D are diagrams illustrating a communication system to which the disclosure may be applied according to an embodiment of the disclosure.

Referring to FIG. 1A, it illustrates an example of a case in-coverage (IC) in which all V2X UEs (UE-1 and UE-2) are located within the coverage of the base station. All V2X UEs may receive data and control information from the base station through a downlink (DL) or transmit data and control information through an uplink (UL) to the base station. In this case, the data and control information may be data and control information for V2X communication. The data and control information may be data and control information for general cellular communication. In addition, V2X UEs may transmit/receive data and control information for V2X communication through a sidelink (SL).

Referring to FIG. 1B, it illustrates an example of a case in which the UE-1 is located within the coverage of the base station among V2X UEs and the UE-2 is located outside the coverage of the base station. For example, FIG. 1B illustrates an example of partial coverage (PC) in which some V2X UEs (UE-2) are located outside the coverage of the base station. The V2X UE (UE-1) located within the coverage of the base station may receive data and control information from the base station through a downlink or transmit data and control information through an uplink to the base station. The V2X UE (UE-2) located outside the coverage of the base station may not receive data and control information from the base station through a downlink, and may not transmit data and control information to the base station through an uplink. The V2X UE (UE-2) may transmit/receive data and control information for V2X communication through a sidelink with the V2X UE (UE-1).

Referring to FIG. 1C, it illustrates an example of a case in which all V2X UEs are located outside the coverage of the base station (out of coverage, OOC). Accordingly, the V2X UEs (UE-1 and UE-2) may not receive data and control information from the base station through a downlink, and may not transmit data and control information to the base station through an uplink. The V2X UEs (UE-1, UE-2) may transmit/receive data and control information for V2X communication through a sidelink.

Referring to FIG. 1D, it illustrates an example of a scenario in which V2X UEs (UE-1 and UE-2) located in different cells perform inter-cell V2X communication. Specifically, FIG. 1D illustrates a case in which the V2X UEs (UE-1 and UE-2) are connected to different base stations (RRC connection state) or camping (RRC connection release state, that is, RRC idle state). In this case, the V2X UE (UE-1) may be a V2X transmission UE, and the V2X UE (UE-2) may be a V2X reception UE. Alternatively, the V2X UE (UE-1) may be a V2X reception UE, and the V2X UE (UE-2) may be a V2X transmission UE. The V2X UE (UE-1) may receive a system information block (SIB) from the base station to which it is connected (or camping), and the V2X UE (UE-2) may receive a system information block (SIB) from another base station to which it is connected (or camping). In this case, as the SIB, an existing SIB or a SIB defined separately for V2X may be used. In addition, the information on the SIB received by the V2X UE (UE-1) and the information on the SIB received by the V2X UE (UE-2) may be different from each other. Accordingly, in order to perform V2X communication between UEs (UE-1 and UE-2) located in different cells, a method of interpreting SIB information transmitted from different cells by unifying information or signaling the information may be additionally required.

On the other hand, although FIGS. 1A, 1B, 1C, and 1D illustrate a V2X system including V2X UEs (UE-1 and UE-2) for convenience of description, the disclosure is not limited thereto, and communication between more V2X UEs may be performed. In addition, the interface (uplink and downlink) between the base station and the V2X UEs may be referred to as a Uu interface, and the sidelink between the V2X UEs may be referred to as a PC5 interface. Accordingly, in the disclosure, they may be used interchangeably.

On the other hand, in the disclosure, the UE may include a vehicle supporting vehicle-to-vehicle (V2V), a vehicle or pedestrian handset (e.g., a smartphone) supporting vehicle-to-pedestrian (V2P), a vehicle supporting the vehicle-to-network (V2N), or a vehicle supporting the vehicle-to-infrastructure (V21). In addition, in the disclosure, the UE may include a road side unit (RSU) equipped with a UE function, an RSU equipped with a base station function, or an RSU equipped with a part of the base station function and a part of the UE function.

In addition, according to an embodiment of the disclosure, the base station may be a base station supporting both V2X communication and general cellular communication, or a base station supporting only V2X communication. In this case, the base station may be a 5G base station (gNB), a 4G base station (eNB), or an RSU. Accordingly, in this disclosure, the base station may be referred to as an RSU.

FIGS. 2A and 2B are diagrams illustrating a V2X communication method performed through a sidelink according to an embodiment of the disclosure.

Referring to FIG. 2A, a UE-1 201 (e.g., a TX UE) and a UE-2 202 and (e.g., a RX UE) may perform one-to-one communication, and this may be referred to as unicast communication.

Referring to FIG. 2B, the TX UE and the RX UE may perform one-to-many communication, and this may be referred to as groupcast or multicast. In FIG. 2B, UE-1 211, UE-2 212, and UE-3 213 may configure one group (Group A) to perform groupcast communication, and UE-4 214, UE-5 215, UE-6 216, and UE-7 217 may configure another group (Group B) to perform groupcast communication. Each UE may perform groupcast communication only within the group to which it belongs, and communication between different groups may be performed through unicast, groupcast, or broadcast communication. Although FIG. 2B illustrates that two groups (Group A and Group B) are configured for convenience of description, the disclosure is not limited thereto.

On the other hand, although not illustrated in FIGS. 2A and 2B, V2X UEs may perform broadcast communication. Broadcast communication refers to a case in which all V2X UEs receive data and control information transmitted from the V2X transmission UE through a sidelink. For example, in FIG. 2B, assuming that the UE-1 211 is a transmission UE for broadcasting, all UEs (UE-2 212, UE-3 213, UE-4 214, UE-5 215, UE-6 216, and UE-7 217) may receive data and control information transmitted from the UE-1 211.

In NR V2X, unlike in LTE V2X, support may be considered in a form in which a vehicle UE transmits data to only one specific node through unicast and a form in which data is transmitted to a number of specific nodes through groupcast. For example, these unicast and groupcast technologies may be usefully used in service scenarios, such as platooning, which is a technology that connects two or more vehicles into a single network to move the vehicles in a cluster. A leader node of a group connected by group driving may need unicast communication for the purpose of controlling one specific node, and group cast communication may be required for the purpose of simultaneously controlling a group consisting of a number of specific nodes.

FIG. 3 is a diagram illustrating a resource pool defined as a set of resources on time and frequency used for transmission and reception of a sidelink according to an embodiment of the disclosure.

In the resource pool, a resource granularity of the time axis may be a slot. In addition, the resource granularity of the frequency axis may be a sub-channel including one or more physical resource blocks (PRBs). Although the disclosure describes an example of a case in which the resource pool is discontinuously allocated on time, the resource pool may be continuously allocated on time. In addition, although the disclosure describes an example of a case in which the resource pool is continuously allocated on a frequency, a method in which the resource pool is discontinuously allocated on a frequency is not excluded.

Referring to FIG. 3, a case 301 in which the resource pool is discontinuously allocated on time is illustrated. FIG. 3 illustrates a case in which the resource granularity on time consists of slots. First, the sidelink slot may be defined in a slot used for uplink. Specifically, the length of a symbol used as a sidelink in one slot may be configured as sidelink bandwidth part (BWP) information. Accordingly, among the slots used for the uplink, slots in which the length of the symbol configured as the sidelink is not guaranteed may not be the sidelink slots. In addition, slots belonging to the resource pool are excluded from slots to which the sidelink synchronization signal block (S-SSB) is transmitted. Referring to 301 of FIG. 3, a set of slots that may be used as a sidelink on time except for the slots as described above is illustrated as ($t_0^{SL}$, $t_1^{SL}$, $t_2^{SL}$, . . . ). The colored portion of 301 of FIG. 3 represents the side link slots belonging to the resource pool. Sidelink slots belonging to the resource pool may be (pre-) configured with resource pool information through a bitmap. Referring to 302 of FIG. 3, a set of sidelink slots belonging to the resource pool on time is illustrated as ($t_0^{SL}$, $t_0^{SL}$, $t_2^{SL}$, . . . ). On the other hand, in the disclosure, the meaning of (pre-)configuration may refer to configuration information pre-configured in the UE and stored in advance, or may refer to a case in which the UE is configured in a cell-common manner from the base station. Here, the cell-common may mean that the UEs in the cell receive the same information configuration from the base station. In this case, a method of obtaining cell-common information by receiving a sidelink system information block (SL-SIB) from the base station may be considered by the UE. In addition, it may mean a case in which the UE is configured in a UE-specific manner after the RRC connection with the base station is established. Here, UE-specific may be replaced with the term UE-dedicated, and may mean that configuration information is received with a specific value for each UE. In this case, a method in which the UE receives an RRC message from the base station and obtains UE-specific information may be considered. In addition, (pre-)configuration may consider a method configured in the resource pool information and a method not configured in the resource pool information. In a case where the (pre-) configuration is configured in the resource pool information, except for the case where the UE is configured in a UE-specific manner after the RRC connection with the base station is established, all UEs operating in the corresponding resource pool may operate with common configuration information. In contrast, the method in which (pre-)configuration is not configured in the resource pool information is basically configured independently of the resource pool configuration information. For example, one or more modes may be (pre-)configured in a resource pool (e.g., A, B, and C), and the (pre-)configured information independently of the resource pool configuration information may indicate which mode (e.g., A, B, or C) to use among (pre-)configured modes in the resource pool.

Referring to 303 of FIG. 3, a case in which the resource pool is continuously allocated on the frequency is illustrated. On the frequency axis, resource allocation may be configured with sidelink bandwidth part (BWP) information and may be configured in units of sub-channels. The sub-channel may be defined as a resource granularity on the frequency including one or more physical resource blocks (PRBs). For example, the sub-channel may be defined as an integer multiple of the PRB. Referring to 303 of FIG. 3, the sub-channel may be including five consecutive PRBs, and a sub-channel size (sizeSubchannel) may be the size of five consecutive PRBs. However, the contents illustrated in the drawings are only an example of the disclosure, and the size of the sub-channel may be set to be different, and one sub-channel is generally configured as a continuous PRB, but is not necessarily configured as a continuous PRB. The sub-channel may be a basic unit of resource allocation for PSSCH. In 303 of FIG. 3, startRB-Subchannel may indicate the start location of the sub-channel on a frequency in the resource pool. In a case where resource allocation is performed in units of sub-channels on the frequency axis, resources on the frequency may be allocated through configuration information on the resource block (RB) index (startRB-Subchannel) at which the sub-channel starts, information on how many PRBs the sub-channel consists of (sizeSubchannel), and the total number of sub-channels (numSubchannel). In this case, information on startRB-Subchannel, sizeSubchannel, and numSubchannel may be (pre-)configured as resource pool information on the frequency.

Figure 4:
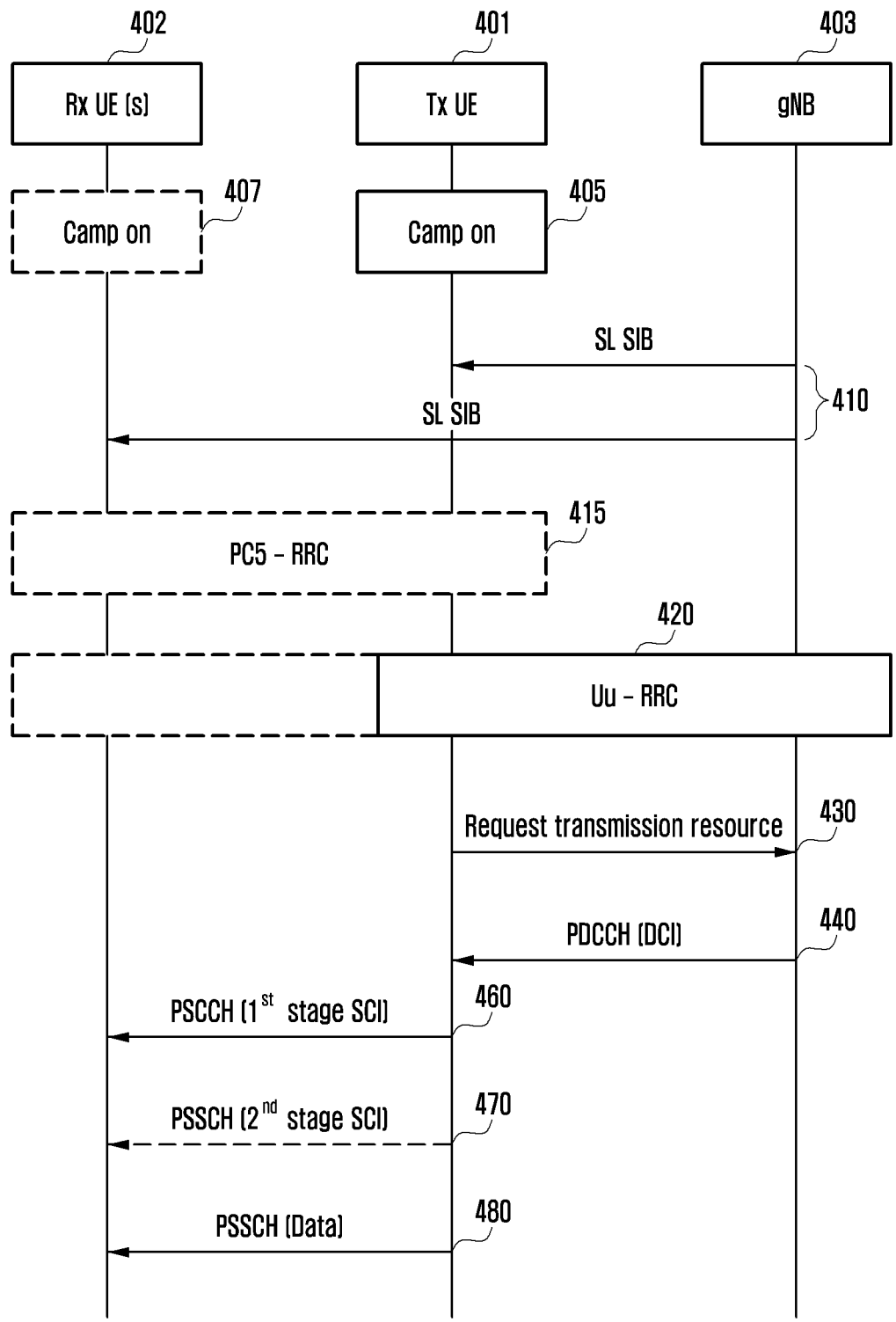
FIG. 4 is a diagram illustrating a method in which a base station allocates a transmission resource in a sidelink according to an embodiment of the disclosure.

FIG. 4 is a diagram illustrating a method in which a base station allocates a transmission resource in a sidelink according to an embodiment of the disclosure.

In the disclosure, a method for the base station to allocate transmission resources in the sidelink is referred to as Mode 1. The Mode 1 may be a scheduled resource allocation. The Mode 1 may indicate a method in which the base station allocates resources used for sidelink transmission to RRC-connected UEs in a dedicated scheduling method. The method of Mode 1 may be effective for interference management and resource pool management because the base station may manage sidelink resources.

Referring to FIG. 4, a transmission UE 401 may camp on 405 a base station (cell) 403. In the disclosure, the camp on may refer to a state in which, for example, a UE in a standby state (RRC_IDLE) may select (or reselect) the base station (cell) as needed and receive system information or paging information, or the like.

On the other hand, in a case where a reception UE 402 is located within the coverage of the base station (cell) 403, the reception UE 402 may camp on 407 the base station (cell) 403. In contrast, in a case where the reception UE 402 is located outside the coverage of the base station (cell) 403, the reception UE 402 may not camp on the base station (cell) 403.

In the disclosure, the reception UE 402 represents a UE receiving data transmitted from the transmission UE 401.

The transmission UE 401 and the reception UE 402 may receive a sidelink system information block (SL-SIB) from the base station 403 (410). The SL-SIB information may include at least one of sidelink resource pool information for sidelink transmission and reception, parameter setting information for sensing operation, information for configuring sidelink synchronization, and carrier information for sidelink transmission and reception at different frequencies.

When data traffic for the V2X is generated in the transmission UE 401, the transmission UE 401 may be RRC-connected to the base station 403 (420). Here, the RRC connection between the UE and the base station may be referred to as Uu-RRC. The Uu-RRC connection process 420 may be performed before data traffic generation of the transmission UE 401. In addition, in Mode 1, the transmission UE may perform transmission to the reception UE through a sidelink in a state in which the Uu-RRC connection process 420 between the base station 403 and the reception UE 402 is performed. On the other hand, in Mode 1, even when the Uu-RRC connection process 420 between the base station 403 and the reception UE 402 is not performed, the transmission UE may perform transmission to the reception UE through the sidelink.

The transmission UE 401 may request a transmission resource capable of performing V2X communication with the reception UE 402 from the base station (430). In this case, the transmission UE 401 may request a sidelink transmission resource from the base station 403 by using a physical uplink control channel (PUCCH), an RRC message, or a medium access control (MAC) control element (CE). On the other hand, the MAC CE may be a buffer state report (BSR) MAC CE or the like in a new format (including information on an indicator indicating that it is at least a buffer state report (BSR) for V2X communication, and the size of data buffered for D2D communication). In addition, the transmission UE 401 may request a sidelink resource through a scheduling request (SR) bit transmitted through the physical uplink control channel.

Next, the base station 403 may allocate a V2X transmission resource to the transmission UE 401. In this case, the base station may allocate transmission resources in a dynamic grant or configured grant method.

First, in the case of the dynamic grant method, the base station may allocate resources for TB transmission through downlink control information (DCI). The sidelink scheduling information included in DCI may include parameters related to transmission time and frequency allocation location information fields of initial transmission and retransmission. The DCI for the dynamic grant method may be CRC scrambled with SL-V-RNTI to indicate that it is the dynamic grant method.

Next, in the case of the configured grant scheme, the base station may periodically allocate resources for TB transmission by setting a semi-persistent scheduling (SPS) interval through the Uu-RRC. In this case, the base station may allocate resources for one TB through the DCI. The sidelink scheduling information for one TB included in the DCI may include parameters related to transmission time and frequency allocation location information of initial transmission and retransmission resources. In a case where resources are allocated in the configured grant method, the transmission time point (occasion) and a frequency allocation location of initial transmission and retransmission for one TB may be determined by the DCI, and resources for the next TB may be repeated at SPS intervals. The DCI for the configured grant method may be CRC scrambled with SL-SPS-V-RNTI to indicate that it is a configured grant method. In addition, the configured grant (CG) method may be divided into Type1 CG and Type2 CG. In the case of Type2 CG, resources configured by the configured grant may be activated/deactivated through the DCI.

Accordingly, in the case of Mode 1, the base station 403 may instruct the transmission UE 401 to schedule a sidelink communication with the reception UE 402 through DCI transmission through a physical downlink control channel (PDCCH) (440).

Specifically, the downlink control information (DCI) used by the base station 403 for sidelink communication to the transmission UE 401 may include, for example, DCI format 3_0 or DCI format 3_1. The DCI format 3_0 may be defined as a DCI for scheduling an NR sidelink in one cell, and the DCI format 3_1 may be defined as a DCI for scheduling an LTE sidelink in one cell. On the other hand, in the disclosure, the format of the DCI transmitted by the base station 403 to the transmission UE 401 for sidelink communication is not limited to the above-described DCI format 3_0 or DCI format 3_1.

In the case of broadcast transmission, the transmission UE 401 may perform transmission without RRC configuration 415 for the sidelink. Alternatively, in the case of unicast or groupcast transmission, the transmission UE 401 may perform a one-to-one RRC connection with another UE. Here, the RRC connection between UEs may be referred to as a PC5-RRC 415, distinguished from the Uu-RRC. In the case of groupcast, the PC5-RRC 415 may be individually connected between the UEs in the group. Referring to FIG. 4, the connection of the PC5-RRC 415 is illustrated as an operation after the transmission 410 of the SL-SIB, but may be performed at any time before the transmission 410 of the SL-SIB or before the transmission of the SCI.

Next, the transmission UE 401 may transmit the SCI ($1^{st}$ stage) to the reception UE 402 through a physical sidelink control channel (PSCCH) (460). In addition, the transmission UE 401 may transmit the SCI ($2^{nd}$ stage) to the reception UE 402 through the PSSCH (470). In this case, information related to resource allocation may be included in the $1^{st}$ stage SCI and other control information may be included in the $2^{nd}$ stage SCI. In addition, the transmission UE 401 may transmit data to the reception UE 402 through the PSSCH (480). In this case, SCI ($1^{st}$ stage), SCI ($2^{nd}$ stage), and PSSCH may be transmitted together in the same slot.

Figure 5:
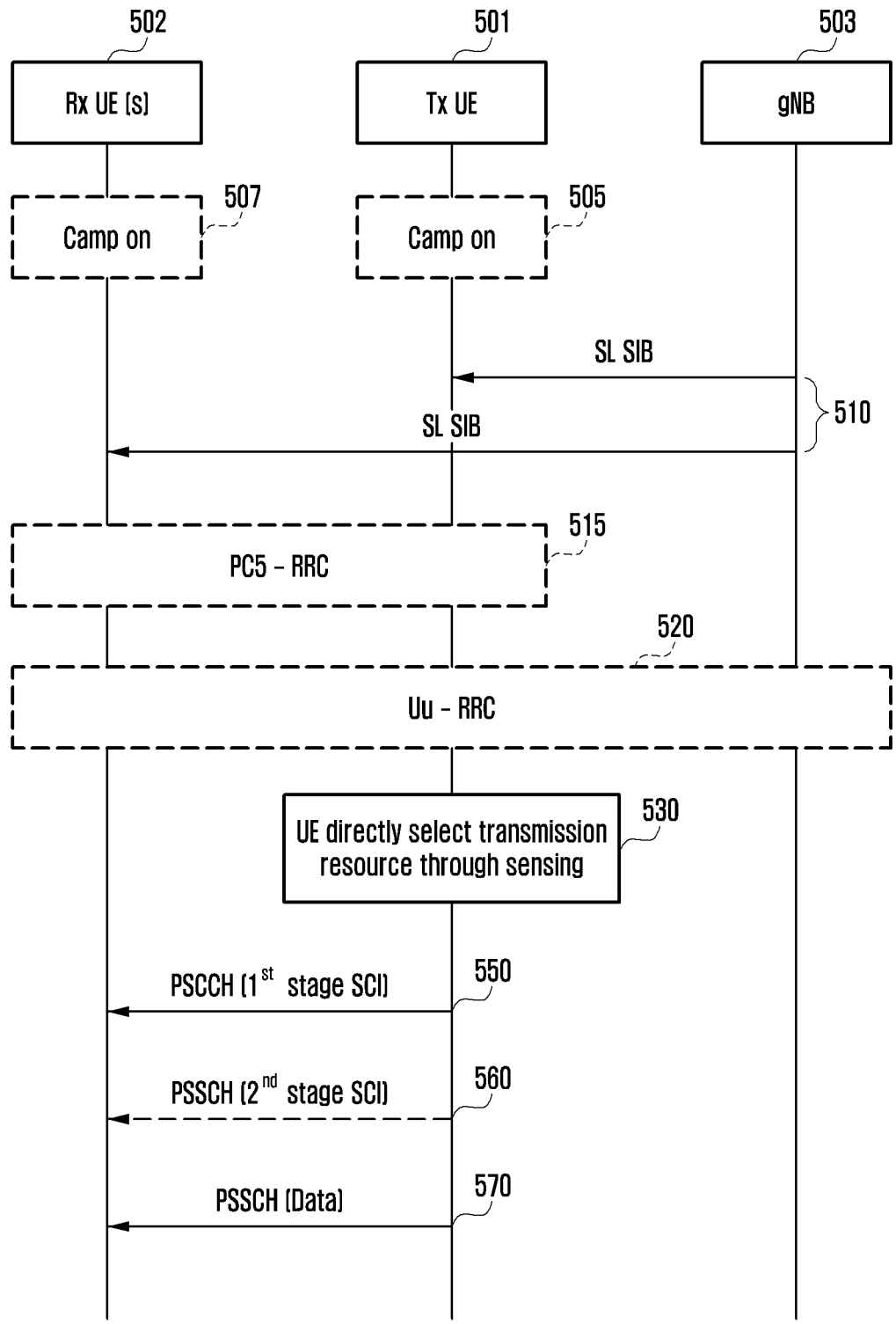
FIG. 5 is a diagram illustrating a method in which a UE directly allocates a transmission resource of a sidelink through sensing in a sidelink according to an embodiment of the disclosure.

FIG. 5 is a diagram illustrating a method in which a UE directly allocates a transmission resource of a sidelink through sensing in a sidelink according to an embodiment of the disclosure.

Referring to FIG. 5, the method in which the UE directly allocates the transmission resource of the sidelink through sensing in the sidelink is referred to as Mode 2. In the case of Mode 2, it may also be referred to as UE automatic resource selection. In Mode 2, the base station 503 may provide a sidelink transmission/reception resource pool for V2X as system information, and a transmission UE 501 may select a transmission resource according to a predetermined rule. Unlike Mode 1 in which the base station directly participates in resource allocation, FIG. 5 differs in that the transmission UE 501 autonomously selects resources and transmits data based on a resource pool previously received through system information.

Referring to FIG. 5, the transmission UE 501 may camp on 505 the base station (cell) 503. The camp on may refer to a state in which, for example, a UE in a standby state (RRC_IDLE) may select (or reselect) the base station (cell) as needed and receive system information or paging information, or the like. In addition, referring to FIG. 5, unlike FIG. 4 described above, in the case of Mode 2, in a case where the transmission UE 501 is located within the coverage of the base station (cell) 503, the transmission UE 501 may camp on 507 the base station (cell) 503. In contrast, in a case where the transmission UE 501 is located outside the coverage of the base station (cell) 503, the transmission UE 501 may not camp on the base station (cell) 503.

On the other hand, in a case where a reception UE 502 is located within the coverage of the base station (cell) 503, the reception UE 502 may camp on 507 the base station (cell) 503. In contrast, in a case where the reception UE 502 is located outside the coverage of the base station (cell) 503, the reception UE 502 may not camp on the base station (cell) 503.

In the disclosure, the reception UE 502 represents a UE receiving data transmitted from the transmission UE 501.

The transmission UE 501 and the reception UE 502 may receive a sidelink system information block (SL-SIB) from the base station 503 (510). The SL-SIB information may include sidelink resource pool information for sidelink transmission and reception, parameter setting information for sensing operation, information for configuring sidelink synchronization, carrier information for sidelink transmission and reception at different frequencies, or the like.

The difference between FIGS. 4 and 5 is that in FIG. 4, the base station 503 and the transmission UE 501 operate in an RRC connected state, whereas in FIG. 5, the UE may also operate in an idle mode 520 (an RRC not connected state). In addition, even in the RRC connected state 520, the base station 503 may allow the transmission UE 501 to autonomously select a transmission resource without directly participating in resource allocation. Here, the RRC connection between the transmission UE 501 and the base station 503 may be referred to as Uu-RRC 520. When data traffic for the V2X is generated in the transmission UE 501, the transmission UE 501 may receive configuration of resource pool from the base station 503 through the system information, and the transmission UE 501 may directly select a resource in the time/frequency domain through sensing in the received configuration of resource pool (530). When the resource is finally selected, the selected resource is determined as a grant for the sidelink transmission.

In the case of broadcast transmission, the transmission UE 501 may perform transmission without RRC configuration 515 for the sidelink. Alternatively, in the case of unicast or groupcast transmission, the transmission UE 501 may perform a one-to-one RRC connection with another UE. Here, the RRC connection between UEs may be referred to as a PC5-RRC 515, distinguished from the Uu-RRC. In the case of groupcast, the PC5-RRC 515 may be individually connected between the UEs in the group. Referring to FIG. 5, the connection of the PC5-RRC 515 is illustrated as an operation after the transmission 510 of the SL-SIB, but may be performed at any time before the transmission 510 of the SL-SIB or before the transmission of the SCI.

Next, the transmission UE 501 may transmit the SCI ($1^{st}$ stage) to the reception UE 502 through PSCCH (550). In addition, the transmission UE 501 may transmit the SCI ($2^{nd}$ stage) to the reception UE 502 through the PSSCH (560). In this case, information related to resource allocation may be included in the $1^{st}$ stage SCI and other control information may be included in the $2^{nd}$ stage SCI. In addition, the transmission UE 501 may transmit data to the reception UE 502 through the PSSCH (570). In this case, SCI ($1^{st}$ stage), SCI ($2^{nd}$ stage), and PSSCH may be transmitted together in the same slot.

Specifically, sidelink control information (SCI) used by the transmission UEs 401 and 501 for sidelink communication to the reception UEs 402 and 502 is SCI ($1^{st}$ stage) and may be, for example, SCI format 1-A. In addition, there may be, for example, SCI format 2-A or SCI format 2-B as the SCI ($2^{nd}$ stage). In SCI ($2^{nd}$ stage), SCI format 2-A may be used by including information for PSSCH decoding when HARQ feedback is not used or when HARQ feedback is used and both ACK and NACK information are included. Alternatively, SCI format 2-B may be used by including information for PSSCH decoding when HARQ feedback is not used or when HARQ feedback is used and only NACK information is included. For example, SCI format 2-B may be limitedly used for groupcast transmission.

FIGS. 6A and 6B are diagrams illustrating a mapping structure of physical channels mapped to one slot in a sidelink according to an embodiment of the disclosure.

Referring to FIGS. 6A and 6B, a mapping for PSCCH/PSSCH/PSFCH physical channels is illustrated. In the case of PSFCH, when HARQ feedback of the sidelink is activated in the higher layer, the resource of the PSFCH on time may be (pre-) configured with resource pool information. Here, the resource in terms of the time that the PSFCH is transmitted may be (pre-)configured with a value of one of every 0, 1, 2, and 4 slots. Here, the meaning of '0' may mean that the PSFCH resource is not used. In addition, 1, 2, and 4 may mean that PSFCH resources are transmitted for every 1, 2, and 4 slots, respectively.

FIG. 6A illustrates a structure of a slot in which a PSFCH resource is configured, and FIG. 6B illustrates a structure of a slot in which a PSFCH resource is not configured. The PSCCH/PSSCH/PSFCH may be allocated to one or more sub-channels on frequency. For details on sub-channel allocation, refer to the description of FIG. 3. Next, referring to FIGS. 6A and 6B to describe a time-based mapping of the PSCCH/PSSCH/PSFCH, one or more symbols before the transmission UE transmits the PSCCH/PSSCH/PSFCH to a corresponding slot 601 may be used as an area 602 for AGC. In a case where the corresponding symbol(s) are used for the AGC, a method of repeatedly transmitting signals of other channels in the corresponding symbol area may be considered. In this case, a part of the PSCCH symbol or the PSSCH symbol may be considered for the repeated signal of another channel. Alternatively, a preamble may be transmitted in the AGC area. In a case where the preamble signal is transmitted, there is an advantage that the AGC execution time may be further shortened compared to the method of repeatedly transmitting signals of other channels. In a case where the preamble signal is transmitted for the AGC, a specific sequence may be used as the preamble signal, and in this case, a sequence, such as a PSSCH demodulation reference signal (DMRS), a PSCCH DMRS, a channel state information-reference signal (CSI-RS), or the like, may be used as the preamble. On the other hand, the sequence used as the preamble in the disclosure is not limited to the above-described example. Additionally, according to FIGS. 6A and 6B, control information related to resource allocation to initial symbols of the slot may be transmitted to the $1^{st}$ stage sidelink control information (SCI) through a PSCCH 603, and other control information may be transmitted to the $2^{nd}$ stage SCI from the region of a PSSCH 604. Data scheduled by the control information may be transmitted to a PSSCH

605. In this case, the location on time at which the 2$^{nd}$ stage SCI is transmitted may be mapped from the symbol at which a first PSSCH DMRS 606 is transmitted.

Referring to FIGS. 6A and 6B, the location on time at which the first PSSCH DMRS 606 is transmitted may be different in a slot in which the PSFCH is transmitted and a slot in which the PSFCH is not transmitted. FIG. 6A illustrates that a physical sidelink feedback channel (PSFCH) 607, which is a physical channel for transmitting feedback information, is located in the last part of the slot. It is possible to secure a predetermined free time (Guard) between the PSSCH 605 and the PSFCH 607 so that a UE that has transmitted and received the PSSCH 605 can prepare to transmit or receive the PSFCH 607. In addition, after transmission and reception of the PSFCH 607, an empty period (Guard) may be secured for a predetermined time.

Hereinafter, a method for a UE to perform resource allocation in a sidelink based on inter-UE coordination proposed in the disclosure will be described through various embodiments of the disclosure. First, in a first embodiment of the disclosure, an overall procedure for when and how the inter-UE coordination may be performed in the sidelink will be described. In a second embodiment of the disclosure, methods for performing the inter-UE coordination will be described. In a third embodiment of the disclosure, an operation of a UE providing coordination information in the first method of performing the inter-UE coordination will be described. In a fourth embodiment of the disclosure, an operation of a UE providing coordination information in the second method of performing the inter-UE coordination will be described. In addition, in a fifth embodiment of the disclosure, an operation of a UE receiving the inter-UE coordination information will be described. On the other hand, it is noted that in the disclosure, the following embodiments may be used in combination with each other.

First Embodiment

In the first embodiment of the disclosure, a specific scenario for the inter-UE coordination in the sidelink is presented through drawings, and an overall procedure for when and how the inter-UE coordination may be performed will be described. Here, the UE may be a vehicle UE and a pedestrian UE.

Figure 7A:
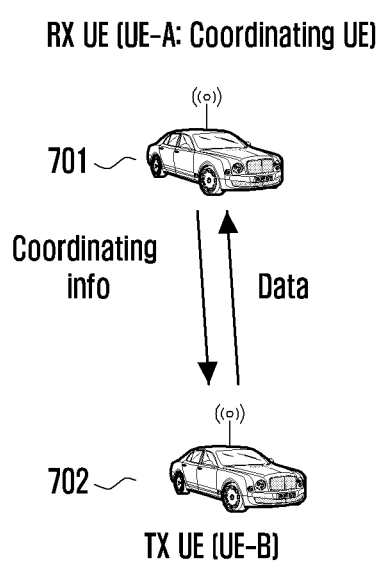
FIGS. 7A and 7B are diagrams illustrating a scenario in which inter-UE coordination is performed according to an embodiment of the disclosure.
Figure 7B:
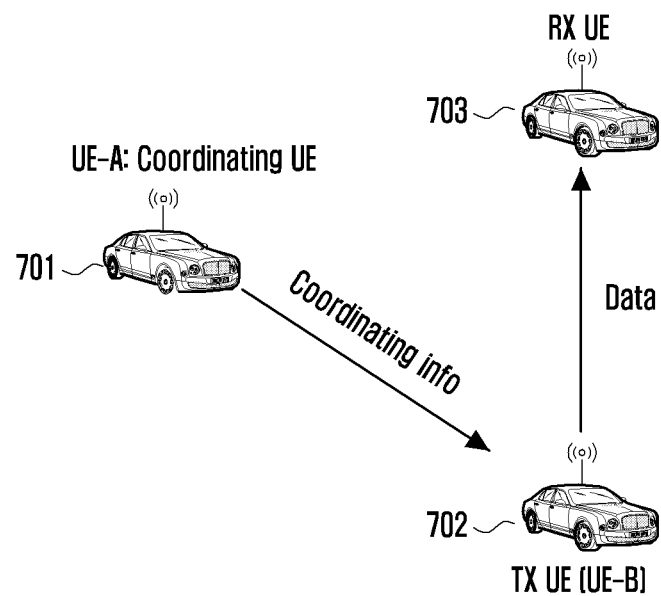

FIGS. 7A and 7B are diagrams illustrating a scenario in which inter-UE coordination is performed according to an embodiment of the disclosure.

In the disclosure, inter-UE coordination may mean providing an improved sidelink service by sharing information that may be helpful to UEs. On the other hand, in the disclosure, information shared for the inter-UE coordination is not limited to specific information. For example, resource allocation information may be included as such information. In general, the UE performing transmission in the sidelink may allocate resources through a direct sensing and resource allocation procedure (Mode2), or in a case where the UE performing transmission is within the coverage of the base station, the resource may be allocated from the base station (Mode1). However, a method in which the UE receives resource allocation and resource allocation-related information from another UE through the inter-UE coordination may be considered. Advantages that may be obtained when resource allocation is performed through the inter-UE coordination in sidelink communication have been described above, and therefore will be omitted here.

Referring to FIGS. 7A and 7B, a scenario in which the inter-UE coordination is performed in a sidelink is illustrated.

In FIGS. 7A and 7B, a UE-A 701 corresponds to a UE that provides resource allocation-related information to a UE-B 702, and the UE-B 702 corresponds to a UE that receives resource allocation-related information from the UE-A 701 and performs sidelink transmission. FIG. 7A illustrates a case in which the UE-A 701 corresponds to a reception UE intended to receive the sidelink transmission from the UE-B 702. In contrast, FIG. 7B illustrates a case in which any UE may be the UE-A 701. Specifically, FIG. 7B illustrates a case in which the UE-A 701 is not a reception UE 703 for the UE-B 702. Through the inter-UE coordination, the UE-B 702 may receive resource allocation-related information from the UE-A 701 and may receive assistance in performing sidelink transmission. Hereinafter, for convenience of description in the disclosure, a UE providing related information for the inter-UE coordination will be referred to as UE-A, and a UE receiving related information for the inter-UE coordination will be referred to as UE-B. Resource allocation-related information that the UE-A may provide to the UE-B and operations for the UE-A therefor will be described in the second to fourth embodiments below. In a case where the UE-B receives resource allocation-related information from the UE-A, a method for UE-B to utilize the information will be described in the fifth embodiment below.

As illustrated in FIGS. 7A and 7B, any UE(s) in the sidelink may be a UE providing resource allocation information, such as the UE-A, and may be a UE receiving resource allocation information, such as the UE-B. In addition, it is noted that it is not necessary for all UEs to be a UE providing resource allocation information such as the UE-A or a UE receiving resource allocation information, such as the UE-B. Specifically, one or more UEs may have a qualification to perform the role of the UE-A (or the UE-B). However, not all UEs having the qualification to perform the role of the UE-A (or the UE-B) become the UE-A (or the UE-B). Accordingly, the UE-A (or the UE-B) may be selected as necessary. In other words, while not performing the role of the UE-A (or the UE-B), the role of the UE-A (or the UE-B) may be performed, and conversely, while performing the role of the UE-A (or the UE-B), the role of the UE-A (or the UE-B) may not be performed. Accordingly, through the embodiment below, in a case where the inter-UE coordination is performed in the sidelink, conditions that may become the UE-A and conditions that may become the UE-B are presented. First, as a condition of becoming the UE-A, at least one of the following conditions may be included. On the other hand, in the disclosure, the condition of becoming the UE-A during the inter-UE coordination is not limited to the following conditions, and some of the following conditions may be combined.

Condition to become UE-A during inter-UE coordination

Condition 1: A UE has the capability to perform inter-UE coordination.

In the above condition 1, the corresponding capability may mean capability capable of providing the corresponding information to another UE during the inter-UE coordination. In addition, in a case where the corresponding capability is defined, the UE may report the corresponding capability to the base station or another UE. For example, as described with reference to FIGS. 7A and 7B, additional UE processing may be required in order for the UE to provide resource allocation-related information to another UE through the inter-UE coordination.

Accordingly, the UE may perform an operation of reporting the UE capability regarding whether the inter-UE coordination may be supported to the base station through the Uu-RRC or to another UE through the PC5-RRC. Accordingly, the base station may determine whether the inter-UE coordination is possible by determining the capability of the corresponding UE. In addition, through this, the UE may determine whether the inter-UE coordination with the UE is possible by determining the capability of the other UE, and may determine whether to request resource allocation-related information.

Condition 2: Inter-UE coordination is enabled on a UE.
  In the condition 2, whether the inter-UE coordination is enabled/disabled may be (pre-)configured. In this case, the (pre-)configuration may be configured for each resource pool. Alternatively, it may be determined whether the inter-UE coordination is enabled from the higher layer of the UE. In the disclosure, the method of determining whether the inter-UE coordination is supported is not limited thereto. For example, a method of signaling enabling and disabling through PC5-RRC, sidelink MAC-CE, SCI ($1^{st}$ SCI or $2^{nd}$ SCI), or the like, may be considered. In addition, the enabling and disabling may consist of a combination of one or more of the above signaling methods.

Condition 3: A UE is configured to be UE-A in inter-UE coordination.
  The condition 3 may be configured through (pre-)configuration or it may be determined whether it is the UE-A from a higher layer of the UE. In the disclosure, the method in which the UE is configured to the UE-A is not limited thereto. For example, a method configured to serve as the UE-A through PC5-RRC, sidelink MAC-CE, SCI ($1^{st}$ SCI or $2^{nd}$ SCI), or the like, may be considered. In addition, it may consist of a combination of one or more of the configured methods.
  The condition 3 may be a case in which a specific UE is configured as a UE providing the inter-UE coordination information in the groupcast. In this case, the corresponding UE may be a leader UE of the group.

Condition 4: A UE is a reception UE intended to receive sidelink transmission of UE-B.
  According to the condition 4, only a UE that receives a signal transmitted from the UE-B may become the UE-A.

Condition 5: It is determined that a UE has a poor signal reception state for UE-B.
  According to the condition 5, in a case where the reception state is not good as a result of receiving the signal transmitted from the UE-B, the corresponding UE may become the UE-A and provide information thereon to the UE-B. In this regard, the condition 5 may be applied together with the condition 4. In this case, determining that the reception state of the signal transmitted from the UE-B is not good may be determined as an error rate of the packet or a failure to receive consecutive packets. The error rate of the packet may be a more statistical criterion, and the failure to receive consecutive packets may be the case in which X (≥1) packets fail to receive consecutively. Here, the packet may mean PSCCH or PSSCH, or PSCCH and PSSCH. On the other hand, in the disclosure, the method of determining that the reception state of a signal to the UE-B is not good is not limited thereto.

Condition 6: A UE has sufficient power to perform inter-UE coordination.
  The condition 6 is caused by the fact that more power consumption may occur because the UE-A should provide related information to the UE-B by performing the inter-UE coordination. Accordingly, it is possible to limit that only the UE configured to full sensing in the Mode2 operation may become the UE-A. Alternatively, it may be limited to be the UE-A only when the battery level of the UE is higher than the set threshold value. Alternatively, in the disclosure, the method in which the UE is configured to the UE-A according to the power state is not limited thereto.

Condition 7: A UE has been triggered to provide information for inter-UE coordination.
  In condition 7 above, triggered to provide information for the inter-UE coordination and the UE becomes UE-A may mean that the UE-B transmits a signal requesting the inter-UE coordination information to the UE-A and the UE receives the signal. Alternatively, a time point at which a specific UE provides information for the inter-UE coordination is defined, and at this time point, the specific UE may operate as the UE-A. In the former case, it may be aperiodic for the UE-A to provide the inter-UE coordination information, and in the latter case, it may be periodic. In the former case, a method in which the UE-B requests the inter-UE coordination information to the UE-A through PC5-RRC, sidelink MAC-CE, SCI ($1^{st}$ SCI or $2^{nd}$ SCI), or the like, may be considered. It may also consist of a combination of one or more of the above requested methods.

Condition 8: A UE has established a unicast link with the UE-B.
  According to the condition 8, inter-UE coordination may be supported only on unicast. In a case where the UE-A and the UE-B establish PC5-RRC, information exchange between UEs may be performed through the PC5-RRC.

Next, as a condition of becoming the UE-B, at least one of the following conditions may be included. In the disclosure, the condition of becoming the UE-B during the inter-UE coordination is not limited to the following conditions, and some of the following conditions may be combined.
  Condition to become UE-B during inter-UE coordination
  Condition 1: Inter-UE coordination is enabled on a UE.
    In the condition 1, whether the inter-UE coordination is enabled/disabled may be (pre-)configured. In this case, the (pre-)configuration may be configured for each resource pool. Alternatively, it may be determined whether the inter-UE coordination is enabled from the higher layer of the UE. In the disclosure, the method of determining whether the inter-UE coordination is supported is not limited thereto. For example, a method of signaling enabling and disabling through PC5-RRC, sidelink MAC-CE, SCI ($1^{st}$ SCI or $2^{nd}$ SCI), or the like, may be considered. In addition, the signaling enabling and disabling may consist of a combination of one or more of the above signaling methods.

Condition 2: A UE is configured to be UE-B in inter-UE coordination.

The condition 2 may be configured through (pre-) configuration or it may be determined whether it is the UE-B from a higher layer of the UE. In the disclosure, the method in which the UE is configured to the UE-B is not limited thereto. For example, a method configured to the UE-B through PC5-RRC, sidelink MAC-CE, SCI ($1^{st}$ SCI or $2^{nd}$ SCI), or the like, may be considered. In addition, it may consist of a combination of one or more of the configured methods.

Condition 3: A UE doesn't have sufficient power.

The condition 3 is caused by the fact that the resource allocation information is provided from the UE-A through the inter-UE coordination and the UE-B does not perform sensing for resource allocation, thereby reducing power consumption. Accordingly, it is possible to limit that the UE configured to partial sensing or random selection in the Mode2 operation may become the UE-B. Alternatively, it may be limited to be the UE-B only when the battery level of the UE is lower than the set threshold value. Alternatively, in the disclosure, the method in which the UE is configured to the UE-B according to the power state is not limited thereto.

Condition 4: A UE cannot perform sensing or has insufficient sensing results.

In the condition 4, a case in which the UE cannot perform sensing or may have insufficient sensing results, for example, a case in which the UE performs sidelink discontinuous reception (DRX) may be considered. It may be assumed that the UE cannot perform sensing in the DRX inactive period. In a case where the UE-B performs sidelink DRX, UE-A needs to transmit information for the inter-UE coordination (resource allocation-related information) to the DRX active period of the UE-B. This is to ensure that the UE-B may successfully receive the inter-UE coordination information provided by the UE-A.

Condition 5: A UE has established a unicast link with the UE-B.

According to the condition 5, inter-UE coordination may be supported only on unicast. In a case where the UE-A and the UE-B establish PC5-RRC, information exchange between UEs may be performed through the PC5-RRC.

Next, in a case where inter-UE coordination is possible in the sidelink and UE-A and UE-B are determined, the following methods may be considered as a method for the UE-A to provide resource allocation-related information to the UE-B through the inter-UE coordination. On the other hand, the disclosure is not limited thereto, and the following methods may be combined, and the UE-A may provide resource allocation-related information to the UE-B according to various methods.

Method 1: UE-A may receive inter-UE coordination information from the base station and provide the information to UE-B.

Method 2: UE-A may directly determine/determine inter-UE coordination information and provide the information to UE-B.

In the case of method 1, it may be possible when the UE-A is within the base station coverage. In addition, the UE-A may report information (helping the base station control the inter-UE coordination of the UE-A and the UE-B) shared from the UE-B to the base station through the Uu-RRC. In a case where the UE-B is outside the base station coverage, the UE-B may request the inter-UE coordination information from the UE-A (this may also be performed, for example, through PC5-RRC, sidelink MAC CE, SCI ($1^{st}$ SCI or $2^{nd}$ SCI), or the like), and the UE-A may request the inter-UE coordination information (resource allocation information) on the UE-B from the base station (this may also be performed, for example, through Uu-RRC, Uu MAC CE, or the like). When the UE-A receives the inter-UE coordination information on the UE-B from the base station, this information may be provided to the UE-B as it is, and the UE-A may provide the information determined by referring to the inter-UE coordination information to the UE-B.

In contrast, in the case of method 2, because the UE-A directly determines/determines the inter-UE coordination information and provides the inter-UE coordination information to the UE-B, the method 2 may be supported regardless of the location (in or out of base station coverage) of the UE-A. A method in which the UE-A determines the inter-UE coordination information and instructs the UE-B when the method 2 is supported through the embodiments below will be described below. Information exchange for the inter-UE coordination in the sidelink between the UE and the UE may be performed through PC5-RRC, sidelink MAC-CE, SCI ($1^{st}$ SCI or $2^{nd}$ SCI), or the like. In addition, it may consist of a combination of one or more of the above methods. In addition, the method of indicating information for performing the inter-UE coordination in the disclosure is not limited thereto.

Second Embodiment

In the second embodiment of the disclosure, in a case where the UE-A provides resource allocation-related information to the UE-B as information on the inter-UE coordination in a sidelink, an operation will be described. Here, the UE (UE-A or UE-B) may be a vehicle UE and a pedestrian UE. The following two methods may be considered as the inter-UE coordination method in which the UE-A provides resource allocation-related information to the UE-B. On the other hand, in the disclosure, the inter-UE coordination method is not limited to the following method, and the following methods may be combined and used.

Inter-UE coordination method

Method 1: UE-A transmits a set of time-frequency resource allocations for transmission of UE-B as the inter-UE coordination information.

In the method 1, the set of time-frequency resource allocation for transmission of the UE-B may be resource allocation information selected for (re) transmission of one or more transport blocks (TBs). In addition, the set of resource allocation selected at this time may be resource allocation information appropriate (preferred) or inappropriate (non-preferred) for transmission of the UE-B. In addition, the selected resource allocation set may include both resources appropriate for transmission of the UE-B and resources inappropriate for transmission of the UE-B. An operation of the UE for the method 1 will be described in the fourth embodiment below.

Method 2: UE-A transmits, as the inter-UE coordination information, whether there is a resource collision with respect to resource allocation information indicated by the UE-B through SCI.

In method 2, whether there is a resource collision in the resource allocation information indicated by the UE-B through SCI may be whether there is a resource collision detected by the UE-A. Alternatively, it may be whether there is a conflict of expected or potential resources. Alternatively, it may include all of the resource collisions detected by the UE-A, expected resource collisions, and potential resource collisions. An operation of the UE for the method 2 will be described in the third embodiment below.

Figure 8:
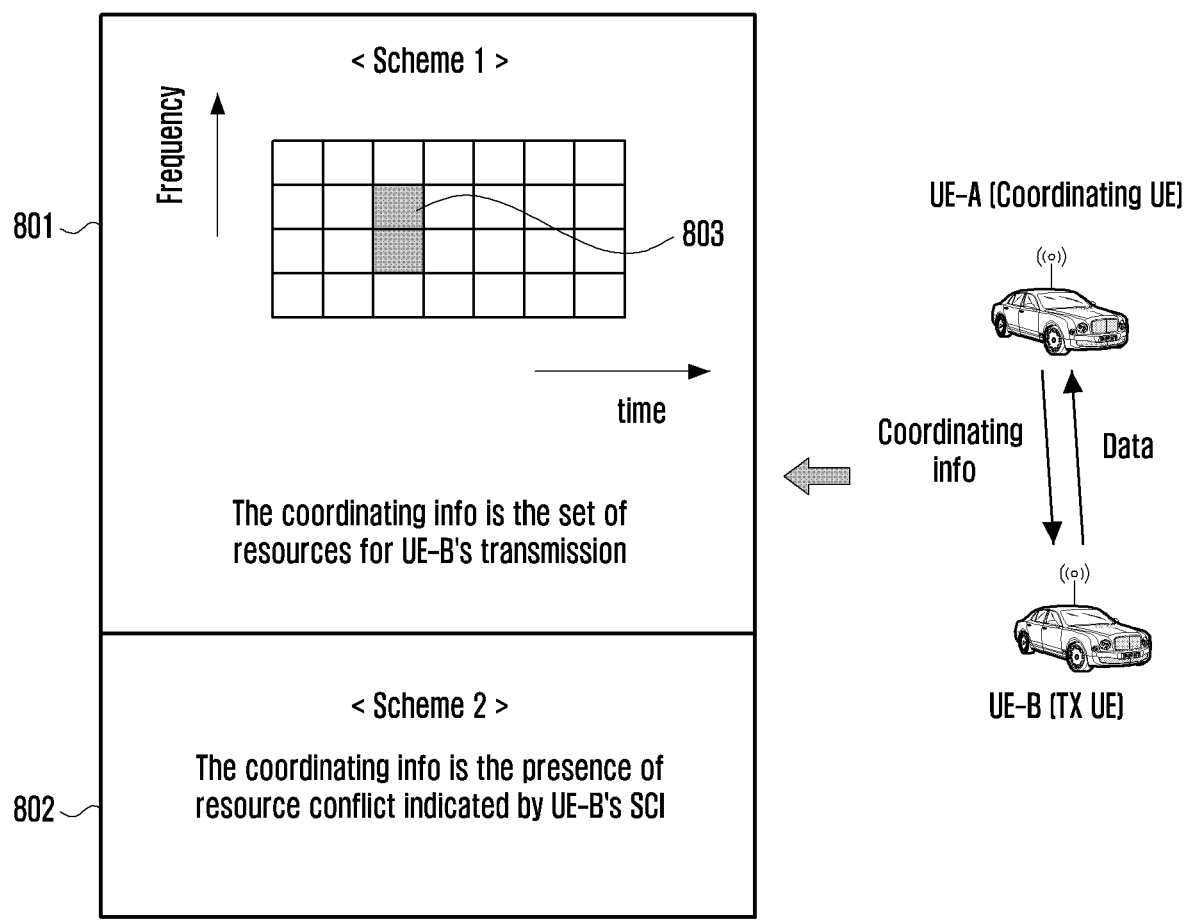
FIG. 8 is a diagram illustrating two methods of inter-user equipment (UE) coordination described above according to an embodiment of the disclosure.

FIG. 8 is a diagram illustrating two methods of inter-UE coordination described above according to an embodiment of the disclosure.

Referring to FIG. 8, according to the inter-UE coordination method 1 801, the UE-A may provide the UE-B with set information 803 of an appropriate (preferred) or inappropriate (non-preferred) time-frequency resource allocation for transmission. In contrast, according to the inter-UE coordination method 2 802, the UE-A may provide to the UE-B only whether the resource reserved by the UE-B through SCI is appropriate. In the case of the inter-UE coordination method 1, because the UE-A has to signal the time-frequency resource allocation set information 803 to the UE-B, the signaling overhead may be increased compared to the inter-UE coordination method 2, but the inter-UE coordination method 1 may provide more resource allocation information. In the case of the inter-UE coordination method 2, because the UE-A signals to the UE-B only whether the resource reserved by the UE-B through SCI is appropriate, the inter-UE coordination method 2 may indicate suitability with 1-bit information, thereby reducing signaling overhead.

On the other hand, in a sidelink communication system to which the disclosure may be applied, only one of the inter-UE coordination method 1 and the inter-UE coordination method 2 may be supported, and both methods may be supported. In a case where both methods are supported, the UE needs to select one of the two methods to operate. Through the embodiment below, conditions under which the method 1 and the method 2 may be selected when both the inter-UE coordination method 1 and the inter-UE coordination method 2 are supported are presented. First, as a condition under which the inter-UE coordination method 1 may be selected, at least one or more of the following conditions may be included. The disclosure is not limited only to the conditions presented below, and some of the conditions below may be combined.

Conditions to operate with the inter-UE coordination method 1

Condition 1: The UE-A is configured to operate with the inter-UE coordination method 1.
 The condition 1 may be configured through (pre-) configuration or it may be determined whether the inter-UE coordination method 1 is from the higher layer of the UE. In the disclosure, the method configured as the inter-UE coordination method 1 is not limited thereto. For example, a method of configuring the inter-UE coordination method 1 through PC5-RRC, sidelink MAC-CE, SCI ($1^{st}$ SCI or $2^{nd}$ SCI), or the like, may be considered. In addition, it may be formed by a combination of one or more of the configured methods. For a detailed description thereof, refer to the embodiments below.

Condition 2: UE-A has sufficient power to perform the inter-UE coordination.
 The condition 2 is based on the assumption that in a case where the UE-A operates with the inter-UE coordination method 1, an additional sensing operation is performed for the inter-UE coordination method 1, and in a case where the UE-A operates as the inter-UE coordination method 2, an additional sensing operation is not performed for the inter-UE coordination method 2, thereby reducing power consumption. Accordingly, it is possible to limit the UE configured to full sensing in Mode2 operation to operating with the inter-UE coordination method 1. Alternatively, it may be limited to operating with the inter-UE coordination method 1 only when the battery level of the UE is higher than a set threshold value. In the disclosure, the method in which the inter-UE coordination method is determined according to the power state of the UE is not limited thereto.

Condition 3: UE-A has established a unicast link with UE-B.
 According to the condition 3, the inter-UE coordination method 1 may be supported only in unicast. In the case of the inter-UE coordination method 1, the UE-A needs to be provided with prior information, such as the UE-B's traffic-related requirements from the UE-B. In a case where the UE-A and the UE-B establish PC5-RRC, information exchange between UEs may be performed through the PC5-RRC.

Next, as a condition under which the inter-UE coordination method 2 may be selected, at least one or more of the following conditions may be included. The disclosure is not limited only to the conditions presented below, and some of the conditions below may be combined.

Conditions to operate with the inter-UE coordination method 2

Condition 1: The UE-A is configured to operate with the inter-UE coordination method 2.
 The condition 1 may be configured through (pre-) configuration or it may be determined whether the inter-UE coordination method 2 is from the higher layer of the UE. In the disclosure, the method configured as the inter-UE coordination method 2 is not limited thereto. For example, a method of configuring the inter-UE coordination method 2 through PC5-RRC, sidelink MAC-CE, SCI ($1^{st}$ SCI or $2^{nd}$ SCI), or the like, may be considered. In addition, it may be formed by a combination of one or more of the configured methods. For a detailed description thereof, refer to the embodiments below.

Condition 2: UE-A has insufficient power.
 The condition 2 is based on the assumption that in a case where the UE-A operates with the inter-UE coordination method 1, an additional sensing operation is performed for the inter-UE coordination method 1, and in a case where the UE-A operates as the inter-UE coordination method 2, an additional sensing operation is not performed for the inter-UE coordination method 2, thereby reducing power consumption. Accordingly, it is possible to limit the UE configured to partial sensing or random selection in Mode2 operation to operating with the inter-UE coordination method 2. Alternatively, it may be limited to operating with the inter-UE coordination method 2 only when the battery level of the UE is lower than a set threshold value. In the disclosure, the method in which the inter-UE coordination method is determined according to the power state of the UE is not limited thereto.

Condition 3: UE-A has received SCI from UE-B.
 The condition 3 is caused by the fact that unlike the inter-UE coordination method 1, the inter-UE coordination method 2 may determine whether it is appropriate only when UE-A receives SCI (1ˢᵗ SCI, in other words, PSCCH) from UE-B and identifies resource information reserved by the UE-B. Accordingly, in a case where the UE-A receives the SCI from the UE-B, it may be limited to operating with the inter-UE coordination method 2.

Condition 4: UE-A cannot perform resource allocation for transmission of UE-B.

The condition 4 may correspond to a case in which the UE-A cannot operate with the inter-UE coordination method 1. This may correspond to a case where the UE-A cannot operate with the inter-UE coordination method 1 by UE capability. On the other hand, it may correspond to a case where the corresponding information is no longer valid even if the UE-A selects a resource through the inter-UE coordination method 1 due to the delay time occurring in the inter-UE coordination.

In the above, in a case where the inter-UE coordination method 1 and the inter-UE coordination method 2 are supported in the sidelink, conditions for the UE-A to select one of the two methods are presented. Hereinafter, for convenience of description, in the case of the inter-UE coordination method 1, a set of resource allocation appropriate (preferred) for transmission of the UE-B selected by the UE-A will be referred to as information 1, and a set of resource allocation that is inappropriate (non-preferred) for transmission of the UE-B selected by the UE-A will be referred to as information 2. In addition, in the case of the inter-UE coordination method 2, whether resources collide with the transmission of UE-B detected by UE-A will be referred to as information 1, and whether resources collide with the transmission of UE-B that UE-A expects or potential will be referred to as information 2. If only one of {method1, method2} is supported, one of {method1, method2} is configured, one of {information1, information2} is supported, or one of {information1, information2} is configured, there may be cases where the UE-A and the UE-B have a common understanding of the methods and information used. What is configured here may be (pre-)configured in the resource pool or may be configured as PC5-RRC between UEs. However, in many cases presented above, for example, in a case where, the UE-A supports or indicates all {method 1, method 2}, the UE-A selects one of {method 1, method 2} according to a specific condition, the UE-A supports or indicates all {information 1, information 2}, or the UE-A selects one of {information 1, information 2} according to a specific condition, the UE-B needs to understand what kind of inter-UE coordination method and inter-UE coordination information the UE-A has indicated. Accordingly, in the following embodiments of the disclosure, a solution is presented for a case where mutual understanding between the UE-A and the UE-B is required on whether the inter-UE coordination method 1 or the inter-UE coordination method 2 is used and whether information 1 or information 2 is used in each method 1 and method 2. In this case, the following alternatives may be considered. On the other hand, it is noted that the disclosure is not limited to the alternatives below.

Alternative 1: UE-A indicates information on {method 1, method2} and {information 1, information2} used to UE-B.

Alternative 2: UE-B indicates information on {method 1, method2} and {information 1, information2} preferred to UE-B.

Alternative 3: The UE-A and the UE-B indicate the inter-UE coordination method and inter-UE coordination information preferred by the UE-A and the UE-B, respectively, to finally select and indicate information on {method 1, method 2} and {information 1, information 2}.

First, the alternative 1 may be used in the following cases.

Case 1-1: One or more {method1, method2} and {information1, information2} are commonly (pre-)configured in the resource pool An example of the case is illustrated in Table 1 below. According to Table 1, a case in which {method 1, method 2} is set to true and available is illustrated, and a case in which {information 1, information 2} is set to true and available is illustrated.

Case 1-2: One or more {method1, method2} and {information1, information2} are configured to PC5-RRC An example of the case is illustrated in Table 1 below. According to Table 1, a case in which {method 1, method 2} is set to true and available is illustrated, and a case in which {information 1, information 2} is set to true and available is illustrated.

Case 1-3: One or more {method1, method2} and {information1, information2} are (pre-)configured to be UE-dedicated in the resource pool An example of the case is illustrated in Table 1 below. According to Table 1, a case in which {method 1, method 2} is set to true and available is illustrated, and a case in which {information 1, information 2} is set to true and available is illustrated.

Case 1-4: One {method1, method2} and {information1, information2} is (pre-)configured to be UE-dedicated in the resource pool An example of the case is illustrated in Table 2 below. According to Table 2, a case in which only one of {method 1, method 2} is configured to be selectable is illustrated, and a case in which only one of {information 1, information 2} is configured to be selectable is illustrated.

TABLE 1

SL-InterUECoordinationType-r17 ::=  SEQUENCE {
Method 1   ENUMERATED {true}
Method 2   ENUMERATED {true}   }
SL-Scheme1-r17 ::=SEQUENCE {
Information 1    ENUMERATED {true}
Information 2   ENUMERATED {true}   }

TABLE 2

SL-InterUECoordinationType-r17 ::=   Choice {
Method 1
Method 2   }
SL-Scheme1-r17 ::=Choice {
Information 1
Information 2   }

In the case 1-4, the UE-A may indicate to the UE-B the {method 1, method 2} and {information 1, information 2} (pre-)configured to be UE-dedicated. In contrast, in the cases 1-1/1-2/1-3, in one or more of {method 1, method 2} and {information 1, information 2}, the UE-A may determine the inter-UE coordination method and the inter-UE coordination information and indicate the same to the UE-B. In this case, as a first method, UE-A may determine {method 1, method 2} and {information 1, information 2} under certain conditions. Specifically, according to the conditions operating as the inter-UE coordination method 1 or the inter-UE coordination method 2, for example, the power state and capability of the UE-A may determine {method 1, method2} according to conditions. For example, according to the condition 2, method 1 may be used when the power state of the UE is sufficient, and method 2 may be used otherwise. Alternatively, as a second method, a method in which the UE-A randomly determines {method 1, method 2} and {information 1, information 2} may be considered. Alternatively, as a third method, a method in which the UE-A determines {method 1, method 2} and {information 1, information 2} by UE implementation may also be considered. On the other hand, it is noted that the disclosure is not limited to the above-described methods. Next, methods for indicating {method 1, method 2} and {information 1, information 2} determined by the UE-A to the UE-B are proposed. On the other hand, the disclosure is not limited thereto, and one or more of the following methods are used in combination, or through various methods, the UE-A may indicate the determined {method 1, method 2 and {information 1, information 2} to the UE-B.

Method 1-1: Indication through PC5-RRC or sidelink MAC-CE

Method 1-2: Indication through SCI ($1^{st}$ SCI or $2^{nd}$ SCI)

Method 1-3: Indication through physical sidelink feedback channel (PSFCH)

In the case of method 1-1, because PC5-RRC or sidelink MAC-CE is supported only in sidelink unicast, it may not be supported in broadcast or groupcast. In the case of method 1-2, the $1^{st}$ SCI may be indicated by using a reserved bit in the existing $1^{st}$ SCI, or a method indicated by introducing a new $1^{st}$ SCI may be considered. In addition, in the case of method 1-3, the resource of the PSFCH may be determined in association with the PSCCH or PSSCH received from the UE-B, which may be a PSCCH (e.g., $1^{st}$ SCI) or a PSSCH (e.g., $2^{nd}$ SCI) requesting inter-UE coordination information. In the above methods, a bit field indicating corresponding information may be determined according to {method 1, method 2} and {information 1, information 2}. For example, when indicating {method 1, method 2} or {information 1, information 2}, the indication may be made with 1-bit information. In contrast, when both {method 1, method 2} and {information 1, information 2} are indicated, 2-bit information may be required.

Next, the alternative 2 may be used in the following cases.

Case 2-1: One or more {method1, method2} and {information1, information2} are commonly (pre-)configured in the resource pool An example of the case is illustrated in Table 1 below. According to Table 1, a case in which {method 1, method 2} is set to true and available is illustrated, and a case in which {information 1, information 2} is set to true and available is illustrated.

Case 2-2: Including all cases

The case 2-2 may include both cases in which one or more {method 1, method 2} and {information 1, information 2} are preconfigured and not configured.

In the case 2-1/2-2, the UE-B may determine {method 1 and method 2) and {information 1 and information2} the UE-B wants to receive (preferred), and indicate to the UE-A. In addition, the UE-A may provide the corresponding inter-UE coordination method and inter-UE coordination information to the UE-B according to {method 1, method 2} and {information 1, information 2} indicated by the UE-B. A first method for determining the inter-UE coordination method and inter-UE coordination information that the UE-B wants to receive (preferred) one or more {method 1, method 2} and {information 1, information 2} from the UE-A is a method in which the UE-B determines {method 1, method 2} and {information 1, information 2} according to certain conditions. Specifically, according to the conditions operated by the inter-UE coordination method 1 or the inter-UE coordination method 2 presented above, for example, {method 1, method 2} and {information 1, information 2} may be determined according to conditions, such as the power state and capability of the UE-B. Alternatively, as a second method, a method in which the UE-B randomly determines {method 1, method 2} and {information 1, information 2} may be considered. Alternatively, as a third method, a method in which the UE-B determines {method 1, method 2} and {information 1, information 2} by UE implementation may also be considered. It is noted that the disclosure is not limited to the above-described methods. Next, methods for indicating to the UE-A {method 1, method 2} and {information 1, information 2} that the UE-B wants to receive (preferred) are proposed. On the other hand, the disclosure is not limited thereto, and one or more of the following methods are used in combination, or through various methods, the UE-B may indicate the {method 1, method 2 and {information 1, information 2) that the UE-B wants to receive (preferred) to the UE-A.

Method 2-1: Indication through PC5-RRC or sidelink MAC-CE

Method 2-2: Indication through SCI ($1^{st}$ SCI or $2^{nd}$ SCI)

In the case of method 2-1, because PC5-RRC or sidelink MAC-CE is supported only in sidelink unicast, it may not be supported in broadcast or groupcast. In the case of method 2-2, the $1^{st}$ SCI may be indicated by using a reserved bit in the existing $1^{st}$ SCI, or a method indicated by introducing a new $1^{st}$ SCI may be considered. In a case where the method 2-2 is used, an indicator for requesting the inter-UE coordination information may be included when the corresponding information is indicated through SCI. In the above methods, a bit field indicating corresponding information may be determined according to {method 1, method 2} and {information 1, information 2}. For example, when indicating {method 1, method 2} or {information 1, information 2}, the indication may be made with 1-bit information. In contrast, when both {method 1, method 2} and {information 1, information 2} are indicated, 2-bit information may be required.

Next, the alternative 3 may be used in the following cases.

Case 3-1: When the case corresponds to the case 1-1, case 1-2, or case 1-3

Case 3-2: When the case corresponds to the case 2-1 or case 2-2

In the case 3-1, the UE-A and the UE-B may identify the inter-UE coordination method and inter-UE coordination information preferred by the UE-A and the UE-B, respectively, so that the UE-B may finally select the information for {method 1, method2} and {information 1, information2} and indicate the information to the UE-A, in a case where the UE-A indicates to the UE-B the information on {method 1, method 2} and {information 1, information 2} preferred, and in a case where the UE-B has {method 1, method 2} and {information 1, information 2} that UE-B wants to receive from the UE-A (preferred). In this case, the UE-A may provide inter-UE coordination method and inter-UE coordination information to the UE-B according to information indicated by the UE-B. Priority information of the UE-A and the UE-B may be used as a method that the UE-B finally selects information on {method 1, method 2} and {information 1, information 2} from the inter-UE coordination method and inter-UE coordination information preferred by the UE-A and the UE-B, respectively. Specifically, in a case where the transmission priority of UE-A is high, the inter- UE coordination method and inter-UE coordination information preferred by UE-A may be prioritized. In contrast, in a case where the transmission priority of UE-B is high, the inter-UE coordination method and inter-UE coordination information preferred by UE-B may be prioritized. However, in the disclosure, it is noted that information other than priority information of UE-A and UE-B may be used as the final method and information selection method. Refer to methods 2-1 to 2-2 for a method in which the UE-B indicates corresponding information to the UE-A. In the case 3-2, the UE-A and the UE-B may identify the inter-UE coordination method and inter-UE coordination information preferred by the UE-A and the UE-B, respectively, so that the UE-A may finally select the information for {method 1, method2} and {information 1, information2} and indicate the information to the UE-B, in a case where the UE-B indicates to the UE-A the information on {method 1, method 2} and {information 1, information 2} preferred, and in a case where the UE-A has {method 1, method 2} and {information 1, information 2} preferred. Priority information of the UE-A and the UE-B may be used as a method that the UE-B finally selects information on {method 1, method 2} and {information 1, information 2} from the inter-UE coordination method and inter-UE coordination information preferred by the UE-A and the UE-B, respectively. Specifically, in a case where the transmission priority of UE-A is high, the inter-UE coordination method and inter-UE coordination information preferred by UE-A may be prioritized. In contrast, in a case where the transmission priority of UE-B is high, the inter-UE coordination method and inter-UE coordination information preferred by UE-B may be prioritized. However, in the disclosure, it is noted that information other than priority information of UE-A and UE-B may be used as the final method and information selection method. Refer to methods 1-1 to 1-3 for a method in which the UE-A indicates corresponding information to the UE-B.

Third Embodiment

In the third embodiment of the disclosure, a detailed operation of the UE for the inter-UE coordination method 2 of the sidelink described through the second embodiment will be described. Specifically, in a case where the inter-UE coordination method 2 is used, a method for UE-A to determine and identify that a resource occupied by UE-B through SCI is not appropriate for transmission is described. Here, the UE (UE-A or UE-B) may be a vehicle UE and a pedestrian UE.

According to the inter-UE coordination method 2 of the sidelink, the UE-A transmits, as the inter-UE coordination information, whether there is a resource collision with respect to resource allocation information indicated by the UE-B through SCI. In this case, whether there is a resource collision in the resource allocation information indicated by the UE-B through SCI may be whether there is a resource collision detected by the UE-A. Alternatively, it may be whether there is a conflict of expected or potential resources. Here, whether the UE-A detects resource collisions, the expected resource collisions, or potential resource collisions may be interpreted as inappropriate (non-preferred) resource allocation information indicated by UE-B through SCI. It is noted that the disclosure is not limited to this interpretation, and other similar interpretations may be possible. In the case of the inter-UE coordination method 2, because the UE-A signals to the UE-B only whether the resource reserved by the UE-B through SCI is appropriate, the inter-UE coordination method 2 may indicate suitability with 1-bit information. The UE-A determines that the resource allocation information indicated by the UE-B through SCI is inappropriate (non-preferred), and at least one or more of the following information may be considered. The disclosure is not limited to the information presented below, and the UE-A may determine whether resource allocation information indicated by the UE-B through SCI is inappropriate (non-preferred) based on one or more combinations of the following information or various information.

Information used by UE-A to determine that UE-B's resource allocation information is inappropriate in inter-UE coordination method 2

Information 1: Reception status of a signal transmitted from UE-B

According to the information 1, determining that the reception state of the signal transmitted from the UE-B is not good by the UE-A may include determining that it is an error rate of the packet or a failure to receive consecutive packets. The error rate of the packet may be a more statistical criterion, and the failure to receive consecutive packets may be the case in which X ($\geq 1$) packets fail to receive consecutively. Here, the packet may mean PSCCH or PSSCH, or both PSCCH and PSSCH. On the other hand, in the disclosure, the method of determining that the reception state of a signal to the UE-B is not good is not limited thereto.

Information 2: Result of sensing by UE-A

In the information 2, sensing by the UE-A may mean SCI ($1^{st}$ SCI, in other words, PSCCH) decoding and sidelink reference signal received power (SL RSRP) measurement. Both SCI decoding and SL RSRP measurements may be included or may mean only one of them. The UE-A may determine whether a resource reserved by the UE-B through SCI ($1^{st}$ SCI, in other words, PSCCH) is appropriate through sensing.

Information 3: Resource information selected by UE-A for its NR sidelink transmission According to the information 3, in a case where the resource information selected by UE-A for its NR sidelink transmission overlaps the resource reserved by UE-B through SCI ($1^{st}$ SCI, in other words, PSCCH) on time and frequency, because transmission and reception cannot be performed simultaneously due to half duplex, the UE-A may determine whether the resource reserved by the UE-B through SCI is appropriate through the information 3.

According to the information 3, the resource information selected by the UE-A for its NR sidelink transmission may mean a set of time-frequency resource allocation selected for (re)transmission of one or more transport blocks (TBs).

According to the information 3, the resource information selected by the UE-A for its NR sidelink transmission may include all sets of time-frequency resource allocations selected for (re)transmission of one or more transport blocks (TBs), or may include only a subset. In the case of including only the subset, it may be limited to only the initial transmission resource. This may be because determining whether the initial transmission resource is inappropriate is more important than the retransmission resource.

Information 4: Set information of time-frequency resource allocation that UE-A has selected for another UE-B According to the information 4, because the UE-A may not expect simultaneous reception from different UE-B in a case where the set information of the time-frequency resource allocation selected by the UE-A for another UE-B overlaps the resource reserved by the UE-B through SCI (1$^{st}$ SCI, in other words PSCCH) on time and frequency, through the information 4, it is possible to determine whether the resource reserved by the UE-B through SCI is appropriate.

Information 5: Scheduled or configured resource information for UL transmission by UE-A According to the information 5, because the UE-A may not transmit/receive simultaneously due to half duplex in a case where the scheduled or configured resource information for UL transmission by the UE-A overlaps the resource reserved by the UE-B through SCI (1$^{st}$ SCI, in other words PSCCH) on time and frequency, through the information 5, it is possible to determine whether the resource reserved by the UE-B through SCI is appropriate.

Information 6: LTE sidelink transmission/reception information of UE-A

According to the information 6, because the UE-A may not transmit/receive simultaneously or expect resource collision due to half duplex in a case where the resource allocation information for LTE sidelink transmission and reception by the UE-A overlaps the resource reserved by the UE-B through SCI (1$^{st}$ SCI, in other words PSCCH) on time and frequency, through the information 6, it is possible to determine whether the resource reserved by the UE-B through SCI is appropriate.

Information 7: PSFCH transmission/reception information of UE-A

According to the information 7, because PSFCH transmission/reception is determined by the location of resources allocated for PSSCH transmission, and it may be determined that the time and frequency resource location of the PSSCH resource reserved by UE-B through SCI (1$^{st}$ SCI, in other words PSCCH) is inappropriate for PSFCH transmission/reception, through the information 7, it is possible to determine whether the resource reserved by the UE-B through SCI is appropriate.

Information 8: Inter-UE coordination information received by UE-A from another UE According to the information 8, because the UE-A may not transmit/receive simultaneously or expect resource collision due to half duplex in a case where appropriate (preferred) or inappropriate (non-preferred) resource allocation-related information received by UE-A from another UE overlaps the resource reserved by the UE-B through SCI (1$^{st}$ SCI, in other words PSCCH) on time and frequency, through the information 8, it is possible to determine whether the resource reserved by the UE-B through SCI is appropriate.

Information 9: Location information provided by UE-A from UE-B or other UEs

According to the information 9, because it may be expected that small interference occurs when the distance is long according to the location information even in a case where a resource collision is expected for a resource reserved by UE-B through SCI (1$^{st}$ SCI, in other words PSCCH), through the information 9, it is possible to determine whether the resource reserved by the UE-B through SCI is appropriate.

Information 10: Information on whether UE-B may use inter-UE coordination information According to the information 10, when the UE-B may not use inter-UE coordination information by the information 10 even in a case where a resource collision is expected for a resource reserved by UE-B through SCI (1$^{st}$ SCI, in other words PSCCH), the UE-A may not provide the inter-UE coordination information to the UE-B. Whether the UE-B may use the inter-UE coordination information is related to the determination of the UE-B, and refer to a condition that becomes the UE-B during the inter-UE coordination of the first embodiment of the disclosure.

Note that information used for determining that the resource allocation information of the UE-B is inappropriate in the inter-UE coordination method 2 presented above may also be used in the inter-UE coordination method 1. For a detailed description thereof, refer to the fourth embodiment of the disclosure.

Fourth Embodiment

In the fourth embodiment of the disclosure, a detailed operation of the UE for the inter-UE coordination method 1 of the sidelink described through the second embodiment will be described. Specifically, in a case where the inter-UE coordination method 1 is used, a method for UE-A to select a preferred transmission resource of the UE-B through sensing is described. Here, the UE (UE-A or UE-B) may be a vehicle UE and a pedestrian UE.

Figure 9:
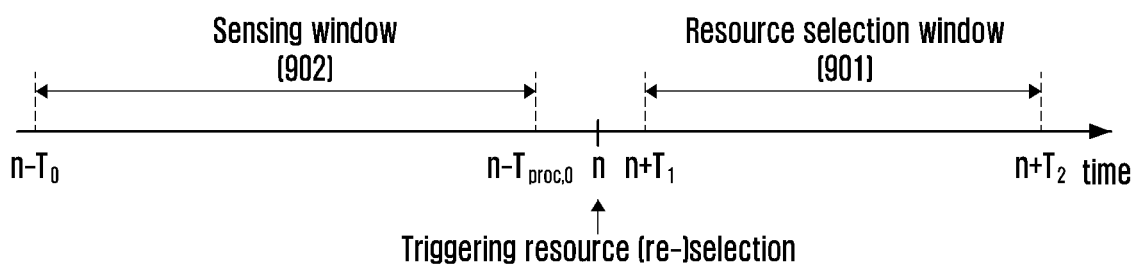
FIG. 9 is a diagram illustrating a sensing window and a resource selection window in Mode 2 in which a UE selects a transmission resource through sensing according to an embodiment of the disclosure.

FIG. 9 is a diagram illustrating a sensing window and a resource selection window in Mode 2 in which a UE selects a transmission resource through sensing according to an embodiment of the disclosure.

Referring to FIG. 9, first, the Mode2 operation in which a general UE selects a transmission resource through sensing may be performed through seven steps as illustrated in Table 3 below. When the (re)selection of a resource in slot 'n' is triggered in a case where the UE performs a Mode2 operation, the sensing window and the resource selection window refer to FIG. 9.

TABLE 3

The following steps are used:
1) A candidate single-slot resource for transmission $R_{x,y}$ is defined as a set of $L_{subCH}$ contiguous sub-channels with sub-channel x+j in slot $t_y^{'SL}$ where j = 0, . . . , $L_{subCH}$ − 1. The UE shall assume that any set of $L_{subCH}$ contiguous sub-channels included in the corresponding resource pool within the time interval [n + $T_1$, n + $T_2$] correspond to one candidate single-slot resource, where
 - selection of $T_1$ is up to UE implementation under $0 \le T_1 \le T_{proc,1}^{SL}$, where $T_{proc,1}^{SL}$ is defined in slots in Table 8.1.4-2 where $\mu_{SL}$ is the SCS configuration of the SL BWP;
 - if $T_{2min}$ is shorter than the remaining packet delay budget(in slots) then
  $T_2$ is up to UE implementation subject to $T_{2min} \le T_2 \le$ remaining packet delay budget(in slots); otherwise $T_2$ is set to the remaining packet delay budget(in slots).
The total number of candidate single-slot resources is denoted by $M_{total}$.
2) The sensing window is defined by the range of slots
[n − $T_0$, n−$T_{proc,0}^{SL}$) where $T_0$ is defined above and $T_{proc,0}^{SL}$ is defined in slots in Table 8.1.4-1 where $\mu_{SL}$ is the SCS configuration of the

TABLE 3-continued

SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter Th($p_i$, $p_j$) is set to the corresponding value of RSRP threshold indicated by the i-th field in sl-Thres-RSRP-List, where i = $p_i$ + ($p_j$ −1) * 8.
4) The set $S_A$ is initialized to the set of all the candidate single-slot resources.
5) The UE shall exclude any candidate single-slot resource $R_{x,y}$ from the set $S_A$ if it meets all the following conditions:
   - the UE has not monitored slot $t_m{'}^{SL}$ in Step 2.
   - for any periodicity value allowed by the higher layer parameter sl-ResourceReservePeriodList and a hypothetical SCI format 1-A received in slot $t_m{'}^{SL}$ with 'Resource reservation period' field set to that periodicity value and indicating all subchannels of the resource pool in this slot, condition c in step 6 would be met.
6) The UE shall exclude any candidate single-slot resource $R_{x,y}$ from the set $S_A$ if it meets all the following conditions:
   a) the UE receives an SCI format 1-A in slot $t_m{'}^{SL}$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213]:
   b) the RSRP measurement performed, according to clause 8.4.2.1 for the received SCI format 1-A, is higher than Th($prio_{RX}$, $prio_{TX}$);
   c) the SCI format received in slot $t_m{'}^{SL}$ or the same SCI format which, if and only if the 'Resource reservation period' field is present in the received SCI format 1-A, is assumed to be received in slot(s) $t'_{m+q\times P'_{rsvp\_RX}}{}^{SL}$ determines according to clause 8.1.5 the set of resource blocks and slots which overlaps with $R_{x,y+j\times P'_{rsvp\_TX}}$ for q=1, 2, . . . , Q and j=0, 1, . . . , $C_{resel}$ − 1. Here, $P'_{rsvp\_RX}$ is $P_{rsvp\_RX}$ converted to units of logical slots according to clause 8.1.7, $Q = \left\lceil \dfrac{T_{scal}}{P_{rsvp\_RX}} \right\rceil$ if $P_{rsvp\_RX} < T_{scal}$ and $n' - n \le P'_{rsvp\_RX}$, where $t_{n'}{}^{SL} = n$ if slot n belongs to the set $(t_0{'}^{SL}, t_1{'}^{SL}, \ldots, t_{T_{max}-1}{'}^{SL})$, otherwise slot $t_{n'}{}^{SL}$ is the first slot after slot n belonging to the set $(t_0{'}^{SL}, t_1{'}^{SL}, \ldots, t_{T_{max}-1}{'}^{SL})$; otherwise Q = 1. $T_{scal}$ is set to selection window size $T_2$ converted to units of msec.
7) If the number of candidate single-slot resources remaining in the set $S_A$ is smaller than X · $M_{total}$, then Th($p_i$, $p_j$) is increased by 3 dB for each priority value Th($p_i$, $p_j$) and the procedure continues with step 4.

The UE shall report set $S_A$ to higher layers.

According to Table 3, the UE determines the total number $M_{total}$ of selectable candidate resources in a resource selection window 901 as illustrated in FIG. 9 in step 1. In step 2, as illustrated in FIG. 9, the UE performs monitoring (sensing) except for slots that are not monitored due to sidelink transmission through SCI decoding and sidelink reference signal received power (SL RSRP) measurement in a sensing window 902. In this case, SCI decoding has the same meaning as PSSCH decoding, and resource allocation information occupied by other UEs may be identified through SCI decoding. In step 3), the UE sets the RSRP threshold value (Th($p_i$, $p_j$)), and in this case, the RSRP threshold value may be determined as a function of a priority value ($P_j$) for resource allocation of the UE and a priority value ($P_i$) of the received SCI. In step 4), the UE initializes the set $S_A$ of the candidate resource to all selectable candidate resources identified in step 1). In step 5), if there are unmonitored slots due to the sidelink transmission in step 2), the UE reflects all resource reservation periods in the sl-ResourceReservePeriodList set as the higher layer for the slot, and excludes the resource from $S_A$ in a case where the corresponding resource overlaps the resource in the set $S_A$ of candidate resources. In step 6), in a case where SCI is decoded for the slot solution for which monitoring (sensing) is performed and the resource allocation information occupied by another UE through SCI decoding overlaps the resource in the set $S_A$ of the candidate resource in step 2), and the measured SL RSRP is higher than the RSRP threshold value, the UE excludes the resource from $S_A$. Finally, in step 7), in a case where the number of remaining resources in the set $S_A$ of the candidate resource is less than X·$M_{total}$, the UE increases the RSRP threshold value by 3 dB and repeats step 4)-step 7). In a case where the number of remaining resources in $S_A$ is greater than or equal to X·$M_{total}$, the UE reports $S_A$ to higher layers.

In a case where the inter-UE coordination method 1 is used and the UE-A selects the preferred transmission resource of the UE-B through sensing, Mode2 resource allocation steps through Table 3 and FIG. 9 may be reused. However, unlike the general Mode2 operation described with reference to Table 3 and FIG. 9, in a case where the UE-A selects a resource for transmission of the UE-B through the inter-UE coordination method 1, at least the following operations may be changed in the Mode2 operation through Table 3 and FIG. 9. The disclosure is not limited to the variations presented below.

Modification of Mode 2 operation when inter-UE coordination method 1 is used

Operation 1: The resource selection window 901 in step 1) in Table 3 may be determined as [n+$T_X$, n+$T_2$]. Here, $T_X$ may be determined according to the following conditions.

$T_X = T_1$ if $T_d \le T_1$ $T_X = T_d$ if $T_d \ge T_1$ $T_d$ is a value defined as a value reflecting the delay generated by performing inter-UE coordination in the sidelink, and may be set through a higher layer or a fixed value. Here, $T_d$ may be set in a slot or ms unit. However, in the disclosure, the value set as $T_d$ is not limited to a specific value.

Operation 2: In step 3) in Table 3, the RSRP threshold value may be set independently of the threshold value set in the general Mode2 operation in a case where the inter-UE coordination method 1 is used, or may be set by applying the offset value.

Operation 3: Step 5) in Table 3 may be skipped, or replaced with a step of excluding resource(s) for which the resource allocation information indicated by the UE-B through the SCI is determined to be inappropriate (non-preferred) by the information that the resource allocation information of the UE-B is determined to be inappropriate in the inter-UE coordination method 2 from the set $S_A$ of candidate resources presented through the third embodiment of the disclosure.

In operation 3, the reason that the Step 5) in operation 3 is skipped is because the resource excluded in step 5) of Table 3 is not a resource excluded through sensing unlike step 6), so it may be inappropriate as appropriate (preferred) or inappropriate (non-preferred) resource allocation information in inter-UE coordination method 1.

In operation 3, the operation of excluding resource(s) for which the resource allocation information indicated by the UE-B through the SCI is determined to be inappropriate (non-preferred) by the information that the resource allocation information of the UE-B is determined to be inappropriate in the inter-UE coordination method 2 from the set $S_A$ of candidate resources may be interpreted as an operation in which the inter-UE coordination method 1 and the inter-UE coordination method 2 are combined. Alternatively, the corresponding operation may be interpreted as being independent of the inter-UE coordination method 2.

Figure 10:
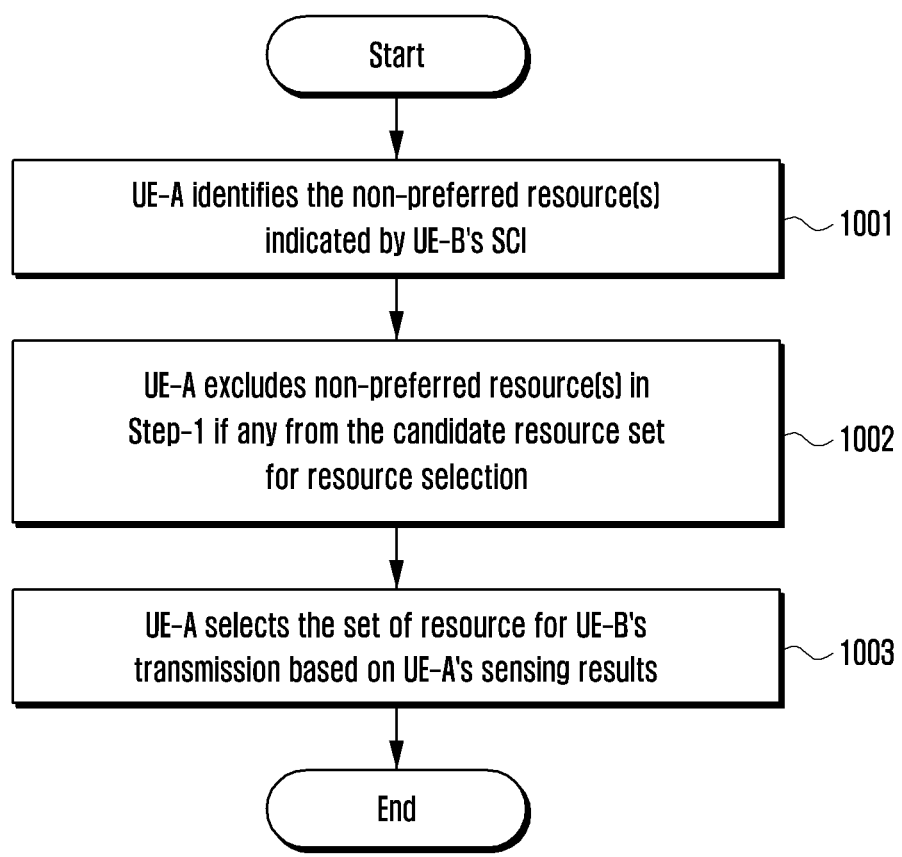
FIG. 10 is a diagram illustrating an operation in which an inter-UE coordination method 1 and an inter-UE coordination method 2 are combined according to an embodiment of the disclosure.

FIG. 10 is a diagram illustrating an operation in which an inter-UE coordination method 1 and an inter-UE coordination method 2 are combined according to an embodiment of the disclosure.

More specifically, FIG. 10 is a diagram illustrating an operation in which the inter-UE coordination method 1 and the inter-UE coordination method 2 are combined in a case where the inter-UE coordination is performed and the UE-A provides appropriate (preferred) resource allocation information for transmission of the UE-B.

Referring to FIG. 10, in a case where inter-UE coordination is performed and the UE-A uses inter-UE coordination method 2, as illustrated in operation 1001 of FIG. 10, the UE-A transmits whether there is a resource collision with respect to resource allocation information indicated by the UE-B as inter-UE coordination method information. Here, whether a resource collision exists may be interpreted as whether the UE-B's resource allocation information is appropriate. In addition, the UE-A may provide the UE-B with 1 bit information only whether the resource reserved by the UE-B is appropriate. On the other hand, in a case where the UE-A uses the inter-UE coordination method 1, An operation in which the inter-UE coordination method 2 is combined may be considered, and operations 1001 to 1003 of FIG. 10 may be considered together. As described above, operation 1001 refers to the inter-UE coordination method 2, and in a case where the inter-UE coordination method 1 is used in operation 1002, a modification of the Mode2 operation may be performed as an operation of excluding resource(s) for which the resource allocation information indicated by the UE-B through the SCI is determined to be inappropriate (non-preferred) by the information that the resource allocation information of the UE-B is determined to be inappropriate in the inter-UE coordination method 2 from the set A of candidate resources presented through the above embodiment 3 in Table 3 as in operation 3. In addition, in operation 1003, UE-A may select a set of time-frequency resource allocation for transmission of the UE-B through inter-UE coordination method 1.

In addition, the following methods may be considered when selecting a set of time-frequency resource allocations for transmission of the UE-B through the inter-UE coordination method 1. The disclosure is not limited to the methods presented below.

Resource allocation method using inter-UE coordination method 1

Method 1: UE-A independently selects and reserves a set of resources for transmission of UE-A and a set of resources for transmission of UE-B through inter-UE coordination method 1.

According to method 1, UE-A may separately select and reserve a set X of resources for transmission of the UE-A and a set Y of resources for transmission of the UE-B. Accordingly, periodic reservations may also be independently applied.

Method 2: UE-A selects and reserves by associating a set of resources for transmission of UE-A and a set of resources for transmission of UE-B through inter-UE coordination method 1.

FIGS. 11A and 11B are diagrams illustrating resource allocation when the inter-UE coordination method 1 is used according to an embodiment of the disclosure.

According to method 2, when UE-A selects and reserves the set X of resources for transmission of UE-A, the set Y of resources for transmission of UE-B may be determined from the set X of resources. Specifically, an example of a case corresponding to FIG. 11A is illustrated.

Referring to FIG. 11A, a resource X for transmission of UE-A is selected 1101 within a resource selection window 1100 and a resource Y for transmission of UE-B may be determined from 1101. For example, a resource reservation period 1103 for resource selection/reservation for transmission of UE-B is set, and a resource 1102 for transmission of UE-B may be selected/reserved therefrom.

According to method 2, when UE-A selects and reserves the set Y of resources for transmission of UE-B, the set X of resources for transmission of UE-A may be determined from the set Y of resources. Specifically, an example of a case corresponding to FIG. 11A is illustrated.

Referring to FIG. 11B, a resource Y for transmission of UE-B is selected 1104 within a resource selection window 1100 and a resource X for transmission of UE-A may be determined from 1104. For example, a resource reservation period 1106 for resource selection/reservation for transmission of UE-A is set, and a resource 1105 for transmission of UE-A may be selected/reserved therefrom.

In a case where the inter-UE coordination method 1 is used and UE-A provides appropriate (preferred) or inappropriate (non-preferred) resource allocation information for transmission of the UE-B, it may be additionally indicated whether the resource allocation information provided by UE-A to UE-B is appropriate (preferred) resource allocation information for transmission of UE-B or inappropriate (non-preferred) resource allocation information. Corresponding information may be signaled as 1-bit information. Such an indication may be performed through a PC5-RRC when a PC5-RRC connection between UEs is performed. In the disclosure, a method of exchanging information required for inter-UE coordination is not limited to PC5-RRC. For example, a method of signaling necessary information through sidelink MAC-CE, SCI ($1^{st}$ SCI or $2^{nd}$ SCI), or the like, may be considered. In addition, it may also consist of a combination of one or more of the above methods.

On the other hand, the inter-UE coordination method 1 is used, and prior information necessary for the UE-A to provide resource allocation information to the UE-B needs to be shared between the UE-A and the UE-B. Specifically, the UE-A needs to provide information, such as TX pool information used by the UE-B, traffic requirements of the UE-B, resource configuration information, and CBR measurement results of the UE-B. For example, assuming that the transmission resource pool (TX pool) used by the UE-B is resource pool A, the UE-A must provide the resource selected from the resource pool A to the UE-B. In general, this is because the transmission resource pool (TX pool) configured in the UE-A and the transmission resource pool (TX pool) configured in the UE-B may be different from each other. If the UE-A is to provide resource allocation information to the UE-B, the transmission resource pool (TX pool) of the UE-B is the same as the transmission resource pool of the UE-A, or otherwise, it may be necessary to know the information. If a plurality of transmission pools are configured in the UE-B, the UE-A may provide the UE-B with a preferred transmission pool among the plurality of transmission pools. In addition, the UE-A may provide the UE-B with time-frequency resource allocation information selected for actual resource transmission within the transmission resource pool of the UE-B. In this way, in order for UE-A to know information on the transmission resource pool (TX pool) of the UE-B and to perform inter-UE coordination, the UE-A may indicate to the UE-B a transmission resource pool to be used by the UE-B, the UE-B may indicate to the UE-A the transmission resource pool information to be used, or the transmission resource pool information may need to be shared between the UE-A and the UE-B. In addition, it may be assumed that inter-UE coordination is performed in the corresponding transmission resource pool. In the disclosure, in a case where the inter-UE coordination is possible and the UE-A and the UE-B are determined, information required for the inter-UE coordination method 1 between the UE-A and the UE-B is not limited to the resource pool information presented above. This kind of exchange of information may be performed through a PC5-RRC when a PC5-RRC connection between UEs is performed. On the other hand, in the disclosure, a method of exchanging information required for inter-UE coordination is not limited to PC5-RRC. For example, a method of signaling necessary information through sidelink MAC-CE, SCI ($1^{st}$ SCI or $2^{nd}$ SCI), or the like, may be considered. In addition, it may also consist of a combination of one or more of the above methods.

Fifth Embodiment

In the fifth embodiment of the disclosure, when UE-B receives resource allocation-related information from UE-A through inter-UE coordination, the UE-B's UE operation is described. Here, the UE (UE-A or UE-B) may be a vehicle UE and a pedestrian UE.

First, in a case where the inter-UE coordination method 1 is used, the following methods may be considered as a UE operation of the UE-B. The disclosure is not limited to the methods presented below. On the other hand, refer to the second embodiment for the condition that the inter-UE coordination method 1 is used.

Operation of UE-B when inter-UE coordination method 1 is used

Method 1: UE-B selects a resource for transmission of UE-B by using the resource allocation information provided from UE-A through inter-UE coordination and the result directly sensed by UE-B.

Method 2: UE-B selects a resource for transmission of UE-B by using only the resource allocation information provided from UE-A through inter-UE coordination.

In a case where the inter-UE coordination method 1 is used, only one of the methods presented above may be supported as the operation of the UE-B. On the other hand, in a case where all of the above methods are supported, whether the UE-B uses the method 1 or the method 2 may be determined by the UE implementation. Alternatively, whether to use the method 1 or the method 2 may be determined according to the power state of the UE-B. This is based on the assumption that in a case where the UE-A operates with the method 1, an additional sensing operation is performed, and in a case where the UE-A operates as the method 2, an additional sensing operation is not performed, thereby reducing power consumption. Accordingly, it is possible to limit the UE configured to partial sensing or random selection in Mode2 operation to operating with the method 2. Alternatively, it may be limited to operating with the inter-UE coordination method 2 only when the battery level of the UE is lower than a set threshold value. In the disclosure, the method in which the UE-B's operation is determined according to the power state of the UE is not limited thereto.

In contrast, in a case where the inter-UE coordination method 2 is used, the following methods may be considered as a UE operation of the UE-B. The disclosure is not limited to the methods presented below. On the other hand, refer to the second embodiment for the condition that the inter-UE coordination method 2 is used.

Operation of UE-B when inter-UE coordination method 2 is used

Method 1: UE-B may perform resource reselection from resource allocation information (whether the resource reserved by UE-B is appropriate) provided from UE-A through inter-UE coordination.

Method 2: UE-B may perform resource retransmission from resource allocation information (whether the resource reserved by UE-B is appropriate) provided from UE-A through inter-UE coordination.

In a case where the inter-UE coordination method 2 is used, only one of the methods presented above may be supported as the operation of the UE-B. On the other hand, in a case where all of the above methods are supported, whether the UE-B uses the method 1 or the method 2 may be determined by the UE implementation.

Sixth Embodiment

In the sixth embodiment of the disclosure, an overall operation in which the UE-A and the UE-B perform inter-UE coordination will be described with reference to FIG. 12.

Figure 12:
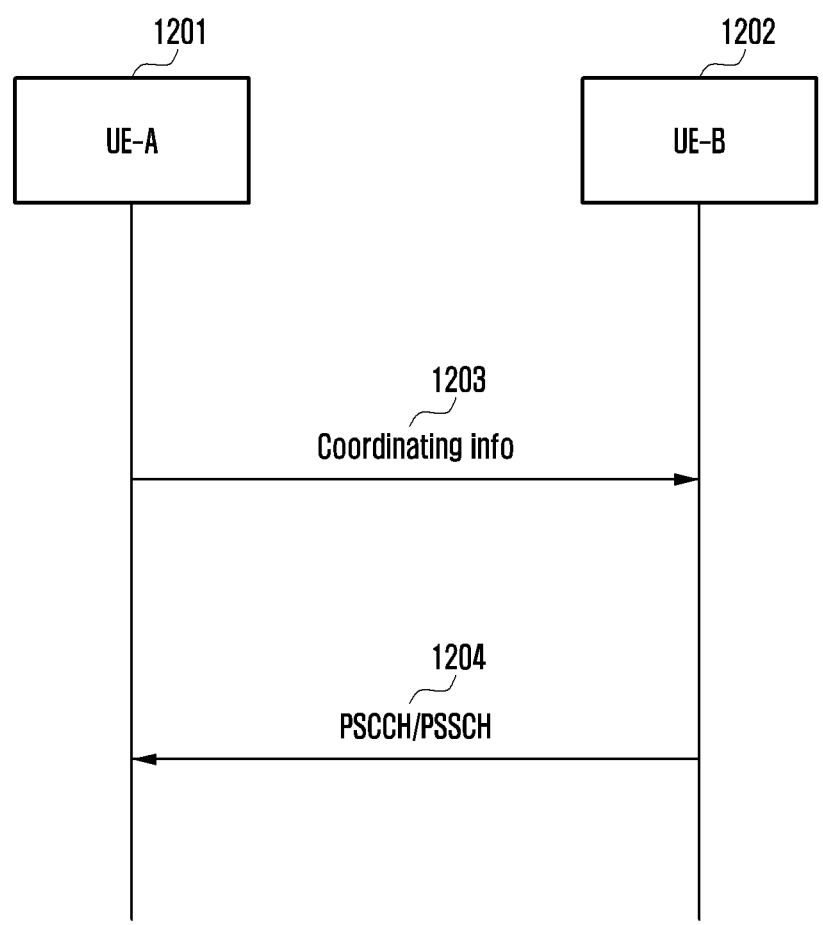
FIG. 12 is a diagram illustrating an overall operation in which UE-A and UE-B perform inter-UE coordination according to an embodiment of the disclosure.

FIG. 12 is a diagram illustrating an overall operation in which UE-A and UE-B perform inter-UE coordination according to an embodiment of the disclosure.

Referring to FIG. 12, a UE providing related information for inter-UE coordination is referred to as a UE-A 1201, and a UE receiving related information for inter-UE coordination is referred to as a UE-B 1202. For the condition to become the UE-A and the condition to become the UE-B when inter-UE coordination is performed in the sidelink, refer to the first embodiment of the disclosure. An inter-UE coordination information 1203 provided by the UE-A 1201 to the UE-B 1202 may be resource allocation-related information on the transmission of the UE-B 1202. For details on such resource allocation-related information, refer to the second embodiment of the disclosure. In the second embodiment of the disclosure, the inter-UE coordination method 1 and the inter-UE coordination method 2 are presented according to the details of resource allocation-related information. In addition, in the second embodiment of the disclosure, a detailed method in which the inter-UE coordination method 1 and the inter-UE coordination method 2 are used has been proposed. More specifically, in a case where the inter-UE coordination method 1 is used, the detailed operation of the UE-A 1201 is referred to the third embodiment of the disclosure. In addition, in a case where the inter-UE coordination method 2 is used, the detailed operation of the UE-A 1201 is referred to the fourth embodiment of the disclosure. In the fourth embodiment of the disclosure, a UE operation in which the inter-UE coordination method 1 and the inter-UE coordination method 2 are combined and operated is also proposed. When the UE-B 1202 receives resource allocation-related information from the UE-A 1201 through inter-UE coordination, a method for the UE-B 1202 to utilize the resource allocation information may be referred to the fifth embodiment of the disclosure. The UE-B 1202 may determine a resource to be transmitted by the UE-B 1202 by using the inter-UE coordination information 1203, or may reselect and retransmit the resource to be transmitted by the UE-B 1202. In this case, the operation of the UE-B 1202 may vary depending on whether the inter-UE coordination information 1203 is the inter-UE coordination method 1 or the inter-UE coordination method 2. Finally, the UE-B 1202 may determine the transmission resource of the UE-B 1202 from the inter-UE coordination information 1203 to perform PSCCH/PSSCH transmission 1204. On the other hand, according to FIG. 12, although it is illustrated that the UE-B 1202 performs the PSCCH/PSSCH transmission 1204 to the UE-A 1201, the UE-B 1202 may also include a case in which the PSCCH/PSSCH transmission 1204 is performed to a UE other than the UE-A 1201. In other words, the UE-A 1201 may not be the receiving UE intended to receive the sidelink transmission of the UE-B 1202.

Figure 13:
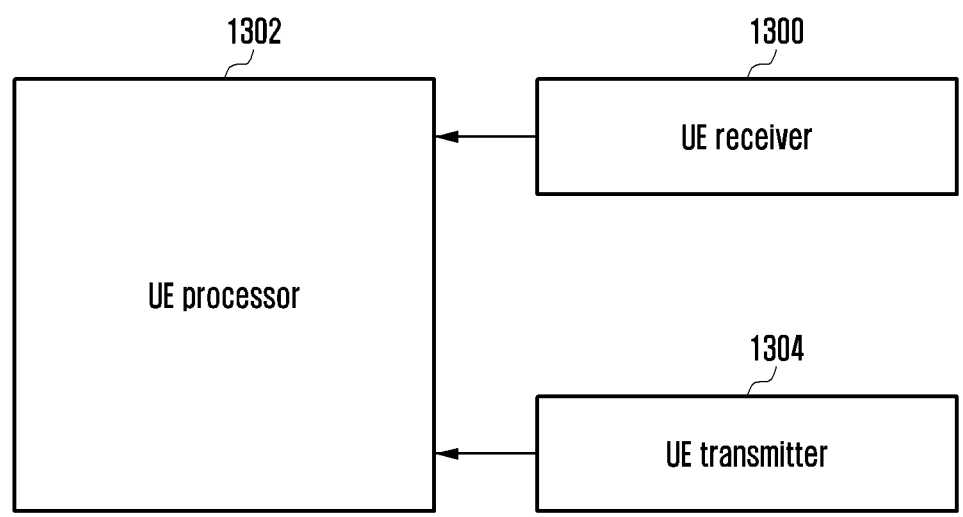
FIG. 13 is a block diagram illustrating an internal structure of a UE according to an embodiment of the disclosure.
Figure 14:
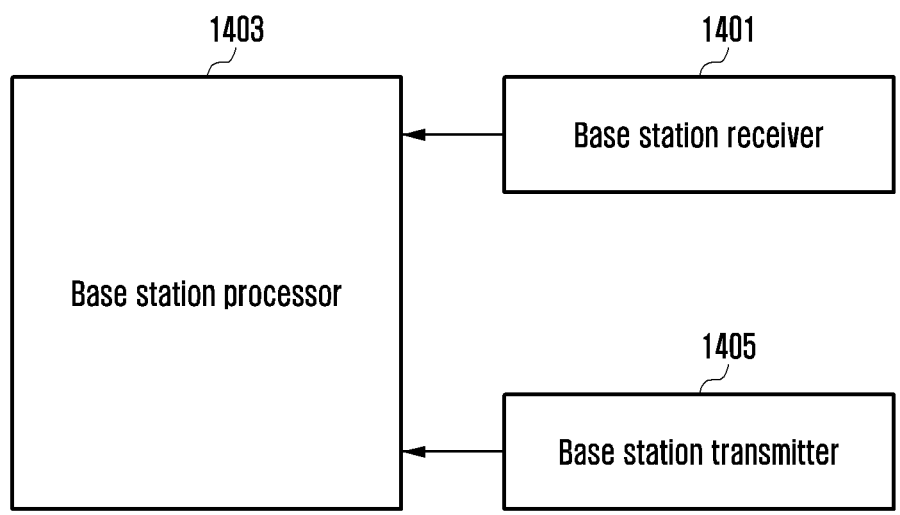
FIG. 14 is a block diagram illustrating an internal structure of a base station according to an embodiment of the disclosure.

In order to perform the above embodiments of the disclosure, a transmitter, a receiver, and a processor of a UE and a base station are illustrated in FIGS. 13 and 14, respectively. In the above embodiments of the disclosure, a method for the UE to perform multi-antenna transmission and reception in the sidelink is illustrated, and to perform this, the receiver, the processor, and the transmitter of the base station and the UE must operate according to the embodiment of the disclosure, respectively.

FIG. 13 is a block diagram illustrating an internal structure of a UE according to an embodiment of the disclosure.

Referring to FIG. 13, the UE of the disclosure may include a UE receiver 1300, a UE transmitter 1304, and a UE processor 1302. The UE receiver 1300 and the UE transmitter 1304 may be collectively referred to as a transceiver in the embodiment of the disclosure. The transceiver may transmit/receive a signal to/from the base station. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel and output the signal to the UE processor 1302, and transmit the signal output from the UE processor 1302 through the wireless channel. The UE processor 1302 may control a series of processes so that the UE may operate according to the above-described embodiment of the disclosure.

FIG. 14 is a block diagram illustrating an internal structure of a base station according to an embodiment of the disclosure.

Referring to FIG. 14, the base station of the disclosure may include a base station receiver 1401, a base station transmitter 1405, and a base station processor 1403. The base station receiver 1401 and the base station transmitter 1405 may be collectively referred to as a transceiver in the embodiment of the disclosure. The transceiver may transmit/receive a signal to/from the UE. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel and output the signal to the base station processor 1403, and transmit the signal output from the base station processor 1403 through the wireless channel. The base station processor 1403 may control a series of processes so that the base station may operate according to the above-described embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first user equipment (UE) in a wireless communication system, the method comprising:
   receiving a message requesting transmission of inter-UE coordination information from a second UE, wherein the message includes resource set type information and wherein the resource set type information indicates whether a request for the inter-UE coordination is a request for inter-UE coordination information including preferred resource set information or a request for inter-UE coordination information including non-preferred resource set information;
   determining inter-UE coordination information based on the message; and
   transmitting the determined inter-UE coordination information to the second UE,
   wherein, based on the resource set type information, the inter-UE coordination information includes the preferred resource set information or the non-preferred resource set information, and
   wherein the resources not available due to half duplex operation are excluded from the preferred resource set information.

2. The method of claim 1,
   wherein the message is transmitted through a $2^{nd}$-stage sidelink control information (SCI) transmitted from a physical sidelink shared channel (PSSCH) or transmitted through a medium access control (MAC) control element (CE).

3. The method of claim 1,
   wherein the first UE is configured as a UE that transmits inter-UE coordination information for sidelink communication through pre-configuration.

4. The method of claim 1,
   wherein the first UE or the second UE is configured to transmit or receive inter-UE coordination information according to the inter-UE coordination method 1 among the inter-UE coordination method 1 or the inter-UE coordination method 2 through pre-configuration,
   wherein the inter-UE coordination method 1 is a method in which inter-UE coordination is performed through inter-UE coordination information including resource set information, and
   wherein the inter-UE coordination method 2 is a method in which inter-UE coordination is performed through inter-UE coordination information including whether resource collision exists.

5. A method performed by a second UE in a wireless communication system, the method comprising:
   transmitting a message requesting transmission of inter-UE coordination information to a first UE, wherein the message includes resource set type information and wherein the resource set type information indicates whether a request for the inter-UE coordination is a request for inter-UE coordination information including preferred resource set information or a request for inter-UE coordination information including non-preferred resource set information; and
   receiving inter-UE coordination information determined based on the message from the first UE,
   wherein, based on the resource set type information, the inter-UE coordination information includes the preferred resource set information or the non-preferred resource set information, and wherein the resources not available due to half duplex operation are excluded from the preferred resource set information.

6. The method of claim 5,
wherein the message is transmitted through a $2^{nd}$-stage sidelink control information (SCI) transmitted from a physical sidelink shared channel (PSSCH) or transmitted through a medium access control (MAC) control element (CE).

7. The method of claim 5,
wherein the second UE is configured as a UE that receives inter-UE coordination information for sidelink communication through pre-configuration.

8. The method of claim 5,
wherein the first UE or the second UE is configured to transmit or receive inter-UE coordination information according to the inter-UE coordination method 1 among the inter-UE coordination method 1 or the inter-UE coordination method 2 through pre-configuration,
wherein the inter-UE coordination method 1 is a method in which inter-UE coordination is performed through inter-UE coordination information including resource set information, and
wherein the inter-UE coordination method 2 is a method in which inter-UE coordination is performed through inter-UE coordination information including whether resource collision exists.

9. A first user equipment (UE) in a wireless communication system, the first UE comprising:
a transceiver; and
at least one processor configured to:
receive a message requesting transmission of inter-UE coordination information from a second UE, wherein the message includes resource set type information and wherein the resource set type information indicates whether a request for the inter-UE coordination is a request for inter-UE coordination information including preferred resource set information or a request for inter-UE coordination information including non-preferred resource set information,
determine inter-UE coordination information based on the message, and
transmit the determined inter-UE coordination information to the second UE,
wherein, based on the resource set type information, the inter-UE coordination information includes the preferred resource set information or the non-preferred resource set information, and
wherein the resources not available due to half duplex operation are excluded from the preferred resource set information.

10. The first UE of claim 9,
wherein the message is transmitted through a $2^{nd}$-stage sidelink control information (SCI) transmitted from a physical sidelink shared channel (PSSCH) or transmitted through a medium access control (MAC) control element (CE).

11. The first UE of claim 9,
wherein the first UE is configured as a UE that transmits inter-UE coordination information for sidelink communication through pre-configuration.

12. The first UE of claim 9,
wherein the first UE or the second UE is configured to transmit or receive inter-UE coordination information according to the inter-UE coordination method 1 among the inter-UE coordination method 1 or the inter-UE coordination method 2 through pre-configuration,
wherein the inter-UE coordination method 1 is a method in which inter-UE coordination is performed through inter-UE coordination information including resource set information, and
wherein the inter-UE coordination method 2 is a method in which inter-UE coordination is performed through inter-UE coordination information including whether resource collision exists.

13. A second user equipment (UE) in a wireless communication system, the second UE comprising:
a transceiver; and
at least one processor configured to:
transmit a message requesting transmission of inter-UE coordination information to a first UE, wherein the message includes resource set type information and wherein the resource set type information indicates whether a request for the inter-UE coordination is a request for inter-UE coordination information including preferred resource set information or a request for inter-UE coordination information including non-preferred resource set information, and
receive inter-UE coordination information determined based on the message from the first UE,
wherein, based on the resource set type information, the inter-UE coordination information includes the preferred resource set information or the non-preferred resource set information, and
wherein the resources not available due to half duplex operation are excluded from the preferred resource set information.

14. The second UE of claim 13,
wherein the message is transmitted through a $2^{nd}$-stage sidelink control information (SCI) transmitted from a physical sidelink shared channel (PSSCH) or transmitted through a medium access control (MAC) control element (CE).

15. The second UE of claim 13,
wherein the second UE is configured as a UE that receives inter-UE coordination information for sidelink communication through pre-configuration.

16. The second UE of claim 13,
wherein the first UE or the second UE is configured to transmit or receive inter-UE coordination information according to the inter-UE coordination method 1 among the inter-UE coordination method 1 or the inter-UE coordination method 2 through pre-configuration,
wherein the inter-UE coordination method 1 is a method in which inter-UE coordination is performed through inter-UE coordination information including resource set information, and
wherein the inter-UE coordination method 2 is a method in which inter-UE coordination is performed through inter-UE coordination information including whether resource collision exists.

* * * * *